US012433909B2

(12) United States Patent
Chaudhuri et al.

(10) Patent No.: US 12,433,909 B2
(45) Date of Patent: Oct. 7, 2025

(54) FORMULATIONS OF CYCLIC MACROMOLECULE-BASED NANOPARTICLES ENCAPSULATING SMALL MOLECULES

(71) Applicant: Board of Regents of The University of Texas System, Austin, TX (US)

(72) Inventors: Sauradip Chaudhuri, Houston, TX (US); Rachael Sirianni, Sugar Land, TX (US)

(73) Assignee: BOARD OF REGENTS OF THE UNIVERSITY OF TEXAS SYSTEM, Austin, TX (US)

( * ) Notice: Subject to any disclaimer, the term of this patent is extended or adjusted under 35 U.S.C. 154(b) by 861 days.

(21) Appl. No.: 17/613,197

(22) PCT Filed: Mar. 25, 2020

(86) PCT No.: PCT/US2020/024627
§ 371 (c)(1),
(2) Date: Nov. 22, 2021

(87) PCT Pub. No.: WO2020/236305
PCT Pub. Date: Nov. 26, 2020

(65) Prior Publication Data
US 2022/0305043 A1 Sep. 29, 2022

Related U.S. Application Data

(60) Provisional application No. 62/850,308, filed on May 20, 2019.

(51) Int. Cl.
*A61K 31/7068* (2006.01)
*A61K 9/51* (2006.01)
*A61K 31/4045* (2006.01)
*A61K 31/4745* (2006.01)
*A61K 31/506* (2006.01)
*A61K 31/538* (2006.01)

(52) U.S. Cl.
CPC ........ *A61K 31/7068* (2013.01); *A61K 9/5161* (2013.01); *A61K 31/4045* (2013.01); *A61K 31/4745* (2013.01); *A61K 31/506* (2013.01); *A61K 31/538* (2013.01)

(58) Field of Classification Search
None
See application file for complete search history.

(56) References Cited

U.S. PATENT DOCUMENTS

| 9,603,800 B2 | 3/2017 | Fahmy et al. |
| 2016/0256550 A1 | 9/2016 | Neumann et al. |
| 2018/0098945 A1 | 4/2018 | Nel et al. |
| 2018/0353446 A1 | 12/2018 | Claypool |

FOREIGN PATENT DOCUMENTS

WO WO-2018208993 A1 11/2018

OTHER PUBLICATIONS

Wang, et al.; Nanoparticle formulations of histone deacetylase inhibitors for effective chemoradiotherapy in solid tumors; Biomaterials. May 2015; 51: 208-215.doi: 10.1016/j.biomaterials.2015.02.015.
Gil et al.; β-Cyclodextrin-poly(β-Amino Ester) Nanoparticles for Sustained Drug Delivery across the Blood-Brain Barrier; Biomacromolecules. Nov. 12, 2012;13(11):3533-41. doi: 10.1021/bm3008633. Epub Oct. 24, 2012. PMID: 23066958.
Householder et al.; pH driven precipitation of quisinostat onto PLA-PEG nanoparticles enables treatment of intracranial glioblastoma; Colloids and Surfaces B: Biointerfaces, vol. 166, Jun. 1, 2018, pp. 37-44.
International Search Report and Written Opinion for PCT/US20/24627, mailed on May 27, 2020.
Pranatharthiharan, et al.; Asialoglycoprotein receptor targeted delivery of doxorubicin nanoparticlesfor hepatocellular carcinoma; Drug Delivery, vol. 24, No. 1, Nov. 2017, pp. 20-29.
Al-Shakarchi, et al.; Combined Effect of Anticancer Agents and Cytochrome C Decorated Hybrid Nanoparticles for Liver Cancer Therapy; Pharmaceutics vol. 10, No. 2, Apr. 12, 2018, E48, pp. 1-14.
Dvorakova, M.; Vanek, T. Histone deacetylase inhibitors for the treatment of cancer stem cells. *Med. Chem. Commun.* 2016, 7, 2217-2231.

Primary Examiner — Patrick T Lewis
(74) Attorney, Agent, or Firm — CANTOR COLBURN LLP

(57) ABSTRACT

In an embodiment, the present disclosure pertains to a composition. In some embodiments, the composition includes a cross-linked network of cyclic macromolecules. In some embodiments, the cyclic macromolecules are covalently cross-linked to one another by a plurality of cross-linking agents. In some embodiments, at least some of the cross-linking agents are covalently functionalized with a plurality of functional groups. In some embodiments, the plurality of functional groups include a chain of at least three atoms that protrude out of the cross-linking agents. In some embodiments, the cross-linking agents and the functional groups form a polymer matrix, such as poly (β-amino ester). In some embodiments, the composition is in the form of particles. In another embodiment, the present disclosure pertains to a method of administering an active agent to a subject. In some embodiments, the method includes administering a composition of the present disclosure to the subject.

25 Claims, 20 Drawing Sheets

| CDNs | SIZE (nm)/ PDI | ZETA POTENTIAL (mV) |
|---|---|---|
| CDN-1 | 275.8 ± 69.3<br>0.22 - 0.28 | 13.3 ± 2.2 |
| CDN-2 | 246.9 ± 84.2<br>0.18 - 0.36 | 17.2 ± 2.2 |
| CDN-3 | 102.3 ± 88.6<br>0.25 - 0.29 | 15.0 ± 0.6 |
| CDN-4 | 335.4 ± 136.4<br>0.15 - 0.31 | 0.1 ± 7.3 |

AMINE-CDN (3)

mPEG$_{550}$ - CDN (4)

AMINE-CDN (2)

AMINE-CDN (3)

mPEG-CDN (4)

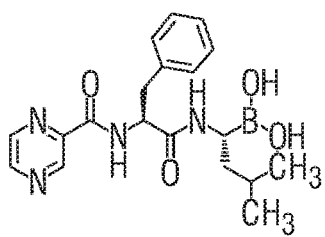
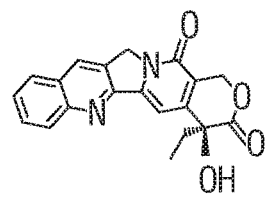
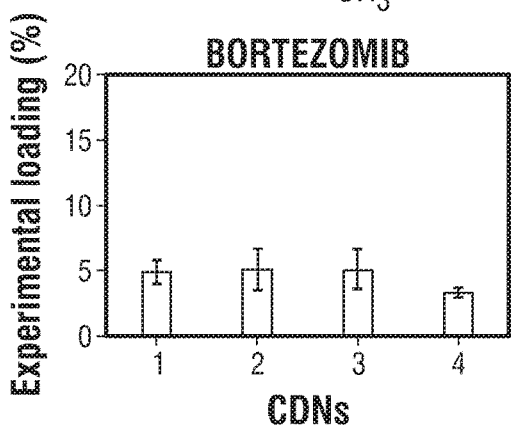
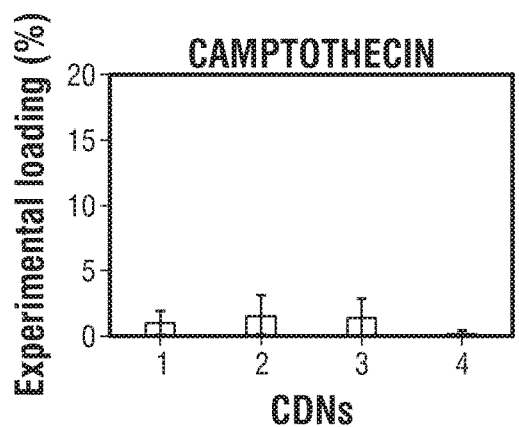
FIG. 10E
FIG. 10F
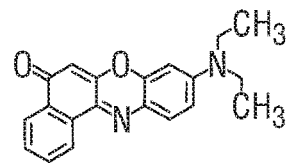
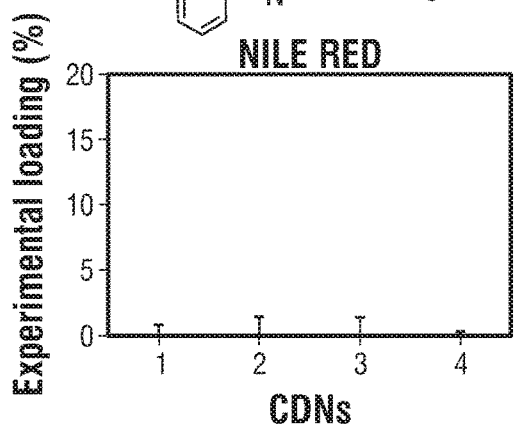
FIG. 10G
I) SYNTHESIS OF ACRYLATED-CD
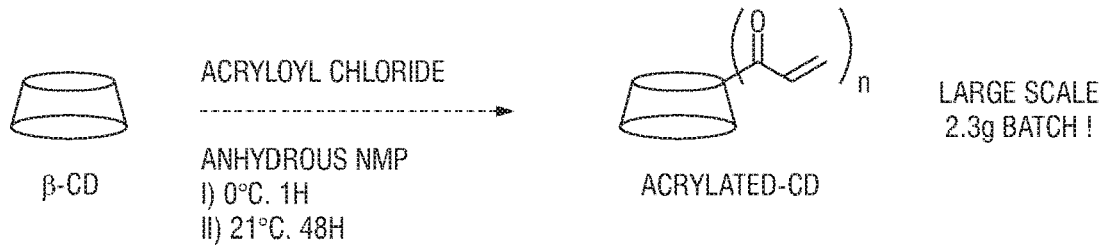
FIG. 11A

FORMULATIONS OF CYCLIC MACROMOLECULE-BASED NANOPARTICLES ENCAPSULATING SMALL MOLECULES

CROSS-REFERENCE TO RELATED APPLICATIONS

This application is a National Stage application of PCT/US2020/024627, filed Mar. 25, 2020, which claims priority to, and the benefit of, U.S. Provisional Patent Application No. 62/850,308, filed on May 20, 2019. The entirety of the aforementioned application are incorporated by reference herein in their entirety.

STATEMENT REGARDING FEDERALLY SPONSORED RESEARCH

This invention was made with government support under NS 107985 awarded by The National Institutes of Health. The government has certain rights in the invention.

BACKGROUND

The administration of free drugs suffer from numerous limitations, such as solubility and limited pharmacokinetics. Current drug delivery agents (e.g., agents that promote drug delivery, such as excipients and/or particle systems) also suffer from numerous limitations, including, for example, poor stability, limited drug loading capacities, limited abilities for sustained drug release and distribution, and inefficient fabrication methods. Various embodiments of the present disclosure address the aforementioned limitations.

SUMMARY

In an embodiment, the present disclosure pertains to a composition. In some embodiments, the composition includes a cross-linked network of cyclic macromolecules. In some embodiments, the cyclic macromolecules are covalently cross-linked to one another by a plurality of cross-linking agents. In some embodiments, at least some of the cross-linking agents are covalently functionalized with a plurality of functional groups. In some embodiments, the plurality of functional groups include a chain of at least three atoms that protrude out of the cross-linking agents. In some embodiments, the cross-linking agents and the functional groups form a polymer matrix. In some embodiments, the polymer matrix includes a poly (β-amino ester) or derivative material. In some embodiments, the composition is in the form of particles.

In some embodiments, the composition is covalently bound to or non-covalently associated with an active agent. In some embodiments, the active agent includes, without limitation, drugs, hormones, analgesics, anti-epileptics, chemotherapeutics, neuroprotective agents, anti-inflammatory agents, anti-neuro-inflammatory agents, cytotoxic agents, Histone deacetylase inhibitors, proteasome inhibitors, imaging agents, targeting agents, and combinations thereof.

In another embodiment, the present disclosure pertains to a method of administering an active agent to a subject. In some embodiments, the method includes administering a composition of the present disclosure that is bound to or associated with the active agent to the subject.

DESCRIPTION OF THE DRAWINGS

FIG. 2A shows a table displaying the mean size, polydispersity index (PDI) and zeta-potential for drug-empty nanoparticles formed by CDN-1, 2, 3 and 4. FIG. 2B shows scanning electron microscope (SEM) image of representative Amine-CDN-3. FIG. 2C shows SEM image of representative CDN-4, which bears mPEG$_{550}$ surface functionality. Scale bars=1 μm. Errors are reported as standard deviations of at least three independently formulated batches.

FIGS. 10A, 10B, 10C, 10D, 10E, 10F, and 10G illustrate average experimental drug loading values of various small molecules for CDN 1-4 for a theoretical loading of 10% (w/w). Molecular structures of compounds illustrating the hydrophobic (red) and ionizable (green) moieties. Error bars are reported as the standard deviation of three separate formulations.

FIGS. 11A, 11B, and 11C illustrate a schematic representation of synthesis of i) acrylated β-cyclodextrin (FIG. 11A); ii) blank (FIG. 11B); and iii) panobinostat-loaded CDN nanoparticles (FIG. 11C).

DETAILED DESCRIPTION

It is to be understood that both the foregoing general description and the following detailed description are illustrative and explanatory and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that include more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Current drug delivery agents suffer from numerous limitations. Such limitations include poor stability, limited drug loading capacities, limited abilities for sustained release and distribution, and inefficient fabrication methods.

For instance, Histone Deacetylase inhibitors (HDACi) are a class of small molecules that promote hyper-acetylation of core histones, which leads to relaxation of chromatin and therapeutic effects in a multitude of disease models. Unfortunately, the utility of HDACi is plagued by problems such as rapid clearance and poor tissue distribution when molecules are delivered in free form.

Various nanoparticle encapsulation strategies to improve drug tolerability, pharmacokinetics, and site-specific delivery of HDAC inhibitors have been developed. However, each of these have approaches for encapsulation of individual HDAC inhibitors requiring development of unique loading strategies for individual drugs, and also requiring intensive effort to yield only modest loading.

Moreover, HDACi loading in and controlled release from nanocarrier systems remains unoptimized. In addition, a generalizable strategy for drug delivery for this class of molecules is lacking.

In sum, a need exists for more effective systems and methods for active agent (e.g., drugs) delivery systems. Various embodiments of the present disclosure address the aforementioned need.

Figure 1A:
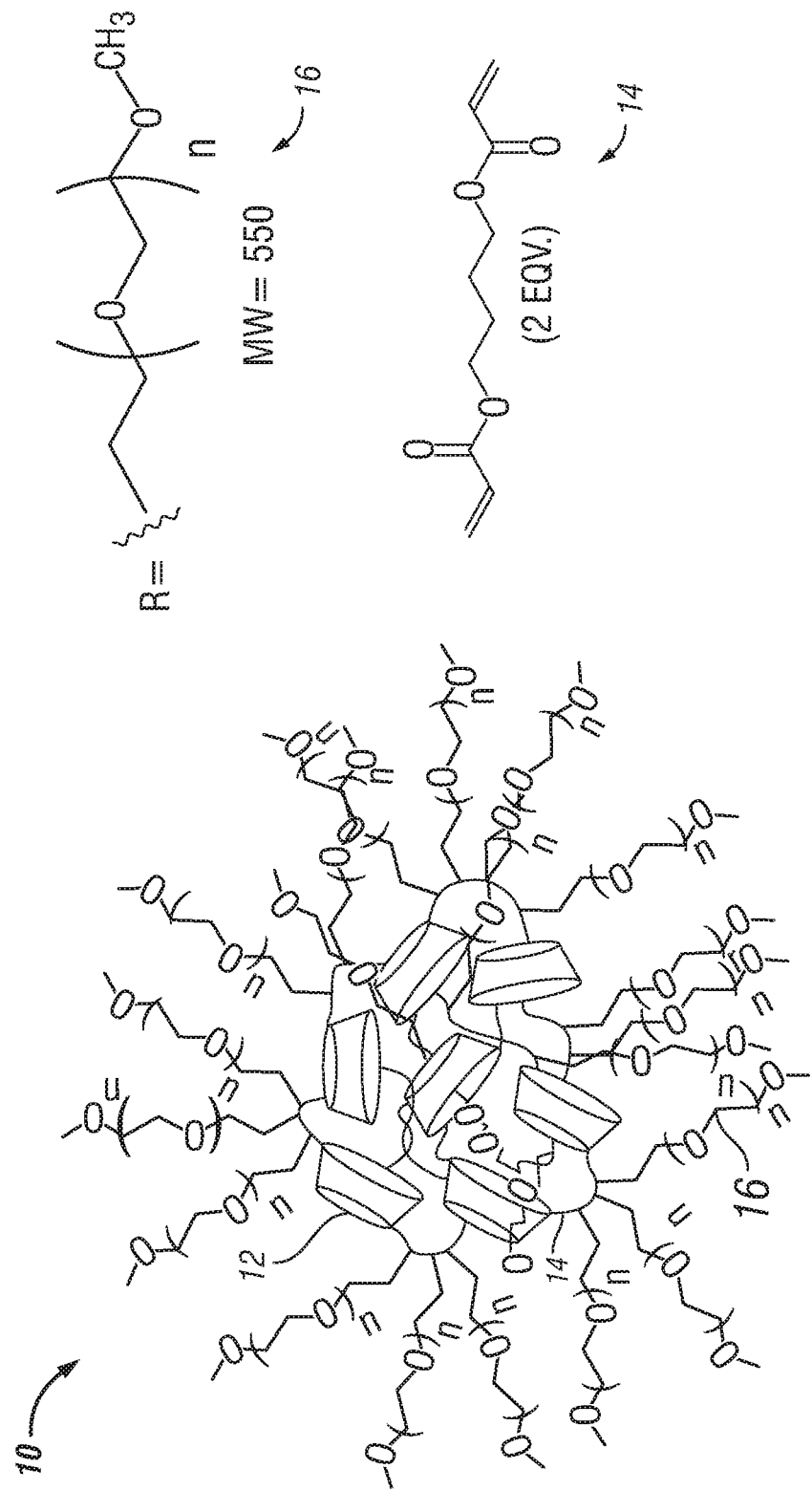
FIG. 1A provides an illustration of a composition with a cross-linked network of cyclic macromolecules according to an aspect of the present disclosure.

In some embodiments, the present disclosure pertains to compositions that include one or more of the following components: particles, cyclic macromolecules, cross-linking agents, functional groups, and active agents. An example of a composition of the present disclosure is illustrated in FIG. 1A as composition (10). In this example, composition (10) includes a covalently cross-linked network of cyclic macromolecules (12) that are cross-linked to one another by a plurality of cross-linking agents (14). In addition, at least some of the cross-linking agents (14) are covalently functionalized with a plurality of functional groups (16) that protrude out of the cross-linking agents. As set forth in more detail herein, the compositions of the present disclosure can include various particles, cyclic macromolecules, cross-linking agents, functional groups, and active agents.

Additional embodiments of the present disclosure pertain to methods of administering a composition of the present disclosure to a subject. In some embodiments illustrated in FIG. 1B, the methods of the present disclosure include a step of administering an active agent-containing composition to the subject (step 20) to result in the sustained release of the active agent to the subject (step 22).

As set forth in more detail herein, the methods and compositions of the present disclosure can have numerous embodiments. For instance, the compositions of the present disclosure can include various particles, cyclic macromolecules, cross-linking agents, functional groups, and active agents. Furthermore, various methods may be utilized to administer the active agent-containing compositions of the present disclosure to a subject. Various methods may also be utilized to make the compositions of the present disclosure.

Compositions

As set forth in more detail herein, the compositions of the present disclosure can include various particles, cyclic macromolecules, cross-linking agents, functional groups, and active agents. For example, the compositions of the present disclosure can include a cross-linked network of cyclic macromolecules. In some embodiments, the cyclic macromolecules are covalently cross-linked to one another by a plurality of cross-linking agents. In some embodiments, at least some of the cross-linking agents are covalently functionalized with a plurality of functional groups. In some embodiments, the plurality of functional groups include a chain of at least three atoms that protrude out of the cross-linking agents.

In some embodiments, the cross-linking agents and the functional groups form a polymer matrix. In some embodiments, the polymer matrix is in the form of a polymer network. In some embodiments, the polymer matrix provides structural integrity to the compositions of the present disclosure. In some embodiments, the polymer matrix includes poly (β-amino ester).

In some embodiments, the composition is in the form of particles. In addition, the compositions of the present disclosure may have various advantageous properties.

Particles

The compositions of the present disclosure can include various forms and/or structures and include various types of particles. For instance, in some embodiments, the compositions of the present disclosure have a shell-like structure (e.g., the shell-like structure shown in FIG. 1A with a hydrophobic core and a hydrophilic outer surface). In some embodiments, the compositions of the present disclosure are in the form of particles (e.g., the particle structure shown in FIG. 1A).

In some embodiments, the particles include a hydrophobic core and a hydrophilic outer surface. In some embodiments, the hydrophilic outer surface has a positive charge. In some embodiments, the hydrophilic outer surface has a negative charge. In some embodiments, the hydrophilic outer surface has a neutral charge.

The particles of the present disclosure can have numerous sizes. For instance, in some embodiments, the particles include diameters ranging from about 10 nm to about 10 µm. In some embodiments, the particles include diameters ranging from 10 nm to about 500 nm. In some embodiments, the particles include diameters ranging from 100 nm to about 500 nm.

In some embodiments, the particles are in the form of colloidal particles. In some embodiments, the particles are in the form of microparticles. In some embodiments, the particles are in the form of nanoparticles.

Cyclic Macromolecules

The compositions of the present disclosure can include various types of cyclic macromolecules. For instance, in some embodiments, the cyclic macromolecules include, without limitation, cyclic oligosaccharides, macrocycles, cyclodextrins, and combinations thereof. In some embodiments, the cyclic macromolecules include cyclodextrins. In some embodiments, the cyclic macromolecules include β-cyclodextrin.

In some embodiments, the cyclic macromolecules include cyclic macromolecules with at least seven membered rings. In some embodiments, the cyclic macromolecules include cyclic macromolecules with at least six membered rings. In some embodiments, the cyclic macromolecules include, without limitation, α-cyclodextrin, γ-cyclodextrin, and combinations thereof. In some embodiments, the cyclic macromolecules include derivatives of β-cyclodextrin. In some embodiments, the derivatives of β-cyclodextrin include acrylated β-cyclodextrin.

Cross-Linking Agents

The compositions of the present disclosure can include various types of cross-linking agents. For instance, in some embodiments, the cross-linking agents include polyacrylic acids. In some embodiments, the cross-linking agents include acrylate-based cross-linking agents. In some embodiments, the cross-linking agents include, without limitation, diacrylate-based cross-linking agents, such as, for example, alkanediol diacrylates of varying length and polyethylene glycol diacrylates of varying length. In some embodiments, the cross-linking agents include polyacrylate-based cross-linking agents. In some embodiments, the cross-linking agents include acrylic-based polymers.

Functional Groups

The compositions of the present disclosure can include various types of functional groups. For instance, in some embodiments, the functional groups include, without limitation, polymers, alkyl chains, amine-based functional groups, and combinations thereof. In some embodiments, the functional groups include, without limitation, polyethylene glycol, polylactic acid, and combinations thereof. In some embodiments, the functional groups include polyethylene glycol. In some embodiments, the functional groups include amine-based functional groups. In some embodiments, the amine-based functional groups are exposed to a surface of the particles.

In some embodiments, the functional groups include polymers, such as hydrophilic polymers. In some embodiments, the functional groups include polyethylene glycols. In some embodiments, the polyethylene glycols are in the form of homopolymers. In some embodiments, the functional groups include amine-based functional groups. In some embodiments, the amine-based functional groups include N,N-Dimethylethylamine.

In some embodiments, the functional groups include targeting agents (e.g., antibodies, peptides, small molecules, or other kinds of molecules that confer targeting ability). In some embodiments, the functional groups include imaging agents (e.g., fluorescent or radioactive molecules that confer imaging ability).

In some embodiments, the compositions of the present disclosure lack any co-polymers. In some embodiments, the compositions of the present disclosure lack polylactic acid (PLA). In some embodiments, the compositions of the present disclosure lack poly(lactic-co-glycolic acid) (PLGA).

In some embodiments, the functional groups include functional groups with a molecular weight of at least 100. In some embodiments, the functional groups include functional groups with a molecular weight of at least 200. In some embodiments, the functional groups include functional groups with a molecular weight of at least 300. In some embodiments, the functional groups include functional groups with a molecular weight of at least 400. In some embodiments, the functional groups include functional groups with a molecular weight of at least 500.

Active Agents

In some embodiments, the compositions of the present disclosure can be associated with various types of active agents. In some embodiments, the active agent is associated with the composition through non-covalent interactions such as, but not limited to, ionic interactions, hydrophobic interactions, hydrogen bonding interactions, and combinations thereof. In some embodiments, the active agent is associated with the composition through covalent bonds. In some embodiments, the active agent becomes associated with particles through interaction between the active agent and the plurality of functional groups.

In some embodiments, the active agent is ionizable. In some embodiments, the active agent is ionized. In some embodiments, the active agent is a hydrophobic molecule. In some embodiments, the active agent is a hydrophobic molecule that contains ionizable or ionized moieties.

In some embodiments, the active agent is a molecule that possesses biological activity. In some embodiments, the active agent includes, without limitation, drugs, hormones, analgesics, anti-epileptics, chemotherapeutics, neuroprotective agents, anti-inflammatory agents, anti-neuro-inflammatory agents, cytotoxic agents, Histone deacetylase inhibitors, proteasome inhibitors, imaging agents, targeting agents, and combinations thereof.

In some embodiments, the active agent may be associated with the particles of the present disclosure through ionic or hydrophobic interactions. In some embodiments, the active agent may be entrapped not through specific interactions with the particles of the present disclosure but by precipitation from the aqueous environment.

In some embodiments, the active agents may be associated with a hydrophobic core of the particles of the present disclosure. In some embodiments, the active agents may be associated with a hydrophilic surface of the particles of the present disclosure. In some embodiments, the active agents may be associated with individual components of the particles of the present disclosure (e.g., intermediate polymer components or regions that are not on the surface or core). In some embodiments, the active agents may be encapsulated by the particles of the present disclosure.

In some embodiments, the active agent constitutes at least about 1% by weight of the composition. In some embodiments, the active agent constitutes at least about 5% by weight of the composition. In some embodiments, the active agent constitutes at least about 20% by weight of the composition. In some embodiments, the active agent constitutes at least about 25% by weight of the composition. In some embodiments, the active agent constitutes at least about 30% by weight of the composition.

The compositions of the present disclosure may be associated with various types of active agents. For instance, in some embodiments, the active agents include ionizable moieties, such as hydroxamic acids. In some embodiments, the active agent is a histone deacetylase inhibitor. In some embodiments, the active agent can include, without limitation, panobinostat, quisinostat, dacinostat, givinostat, bortezomib, camptothecin, nile red, cytarabine, and combinations thereof.

In some embodiments, the active agents of the present disclosure include drugs that are non-covalently associated with the particles of the present disclosure. In some embodiments, the active agents of the present disclosure include imaging agents that are covalently associated with the particles of the present disclosure. In some embodiments, the active agents of the present disclosure include targeting agents that are covalently bound to or non-covalently associated with the particles of the present disclosure.

Methods of Administering Active Agents to a Subject

The compositions of the present disclosure may additionally be utilized to administer active agents to a subject in various manners and methods. For instance, in some embodiments, the method can include administering a composition of the present disclosure that is associated with an active agent to a subject. In some embodiments, the administered compositions of the present disclosure can be in the form of a therapeutic formulation.

Administration

Administration of the compositions of the present disclosure to the subject can occur through various mechanisms. For example, in some embodiments, the administering occurs by a method that includes, without limitation, intravenous administration, subcutaneous administration, transdermal administration, topical administration, intraarterial administration, intrathecal administration, administration to the cerebral ventricles or cisterna magna, intracranial administration, intraperitoneal administration, intraspinal administration, intranasal administration, intraocular administration, oral administration, intratumor administration, and combinations thereof.

In some embodiments, the administration results in the sustained release of the active agent into a desired tissue or region of the subject.

Release of Active Agent

The administration of the compositions of the present disclosure can result the release of the active agents from the compositions in various manners. For example, in some embodiments, the active agent is released through at least 12 hours after administration. In some embodiments, the active agent is released through at least 1 day after administration. In some embodiments, the active agent is released through at least 2 days after administration. In some embodiments, the active agent is released through at least 7 days after administration. In some embodiments, the active agent is released through at least 10 days after administration. In some embodiments, the active agent is released through at least 14 days after administration. In some embodiments, the active agent is released through at least 21 days after administration.

In some embodiments, the active agent has $IC_{50}$ values of less than 1 µM. In some embodiments, the active agent has $IC_{50}$ values of less than 0.10 µM. In some embodiments, the active agent has $IC_{50}$ values of less than 0.01 µM. In some embodiments, the active agent has $IC_{50}$ values of less than 0.05 µM. In some embodiments, the active agent has $IC_{50}$ values of less than 0.0050 µM.

Methods of Making Therapeutic Formulations

Additional embodiments of the present disclosure pertain to therapeutic formulations of the compositions disclosed herein. The therapeutic formulations of the present disclosure generally include compositions of the present disclosure that are associated with active agents. As such, further embodiments of the present disclosure pertain to methods of making the therapeutic formulations of the present disclosure. In some embodiments, such methods include associating the compositions of the present disclosure with an active agent.

Various methods may be utilized to associate the compositions of the present disclosure with an active agent. For instance, in some embodiments, the association occurs by doping the compositions of the present disclosure with the active agent. In some embodiments, the association occurs by mixing the compositions of the present disclosure with the active agent. In some embodiments, the association occurs by mechanically agitating the compositions of the present disclosure with the active agent.

Association of active agents with the compositions of the present disclosure can occur through various mechanisms. For instance, in some embodiments, the association occurs by self-assembly.

Association of active agents with the compositions of the present disclosure can occur under various conditions. For instance, in some embodiments, the association occurs in an aqueous medium. In some embodiments, the association occurs at room temperature. In some embodiments, the association occurs at a neutral pH. In some embodiments, the association occurs without the need for adjustment of any physical parameters, such as pH. Thereafter, the compositions of the present disclosure can be retrieved and concentrated through various processes, such as washing, filtration, or lyophilization.

Applications and Advantages

The compositions and methods of the present disclosure can have various advantageous properties and applications. For instance, in some embodiments, the methods of the present disclosure provide facile and one-step processes for preparing the compositions of the present disclosure through self-assembly. Moreover, in some embodiments, the methods of the present disclosure do not require changes of physical parameters, such as, for example, temperature and pH.

Furthermore, in some embodiments, the compositions of the present disclosure can be utilized to load higher amounts of active agents (e.g., 5 wt % or more in terms of active agent to composition ratio) than existing compositions. In some embodiments, the compositions of the present disclosure can be utilized for the sustained release of bound active agents into various desired tissues.

Furthermore, the structures of the compositions of the present disclosure can be modified in various manners in order to accommodate the association and release of various active agents. For instance, in some embodiments, crosslinker length, surface charge density, and the accessibility of hydrophobic cores can be modified in order to maximize the loading and release of active agents.

Additionally, in some embodiments, the general utility of the compositions of the present disclosure provide for an efficient drug-loading platform for hydrophobic drugs with ionizable moieties. In additional embodiments, the compositions of the present disclosure provide for architectures to enhance drug loading capacities of active agents and biophysical characteristics of the active agents.

Additional Embodiments

Reference will now be made to more specific embodiments of the present disclosure and experimental results that provide support for such embodiments. However, Applicants note that the disclosure below is for illustrative purposes only and is not intended to limit the scope of the claimed subject matter in any way.

Example 1. β-cyclodextrin-poly (β-amino Ester) Nanoparticles are a Generalizable Strategy for High Loading and Sustained Release of HDAC Inhibitors This Example describes that β-cyclodextrin-poly (β-amino ester) nanoparticles are a generalizable strategy for high loading and sustained release of histone deacetylase (HDAC) inhibitors.

Therapeutic development of histone deacetylase inhibitors (HDACi) has been hampered by a number of barriers to drug delivery, including poor solubility and inadequate tissue penetration. Nanoparticle encapsulation could be one approach to improve delivery of HDACi to target tissues. However, effective and generalizable loading of HDACi within nanoparticle systems remains a long-term challenge. Applicants hypothesized that the common ionizable moiety on many HDACi molecules could be capitalized upon for generalizable loading in polymeric nanoparticles. In this Example, Applicants describe a simple, efficient formulation of novel β-cyclodextrin-poly (β-amino ester) networks (CDNs) networks to achieve this goal. Applicants observed that network architecture was a determinant of CDN encapsulation of candidate molecules, with a more hydrophobic core enabling effective self-assembly and a PEGylated surface enabling very high loading (up to ~30% w/w) and slow release into aqueous media (21 days) for the model HDACi panobinostat. Optimized CDN nanoparticles were taken up by GL261 cells in culture, and released panobinostat was confirmed to be bioactive. Pharmacokinetic analyses demonstrated that panobinostat was delivered to the brainstem, cerebellum, and upper spinal cord following intrathecal administration via the cisterna magna in healthy mice. Applicants constructed a library of CDNs to encapsulate various small, hydrophobic, ionizable molecules (panobinostat, quisinostat, dacinostat, givinostat, and bortezomib, camptothecin, nile red, and cytarabine), which yielded important insights into mechanisms of drug loading. Taken in sum, these Examples present a novel nanocarrier platform for encapsulation of HDACi via both ionic and hydrophobic interactions, which is a step toward better treatment of disease via HDACi therapy.

Example 1.1. Introduction

Histone Deacetylase inhibitors (HDACi) are a class of small molecules that promote hyper-acetylation of core histones, which leads to relaxation of chromatin and therapeutic effects in a multitude of disease models. Unfortunately, utility of HDACi is plagued by problems such as rapid clearance and poor tissue distribution when molecules are delivered in free form. Applicant has developed nanoparticle encapsulation strategies to improve drug tolerability, pharmacokinetics, and site-specific delivery of HDAC inhibitors. However, each of these reports has developed approaches for encapsulation of individual HDAC inhibitors, requiring development of unique loading strategies for individual drugs, requiring intensive effort to yield only modest loading. HDACi loading in and controlled release from nanocarrier systems remains unoptimized, and a generalizable strategy for drug delivery for this class of molecules is lacking.

The majority of HDAC inhibitors bear a characteristic hydroxamic acid (zinc ion chelating domain), which is linked to the capping moiety by a spacer of appropriate chain length. This hydroxamic acid enables manipulation of charge and thus drug solubility through changes in solution pH. Applicant previously loaded the HDAC inhibitor quisinostat (JNJ-26481585) onto polymeric nanoparticles composed of poly(lactic acid)-poly(ethylene glycol) (PLA-PEG) through a pH manipulation and ionization strategy. Although these quisinostat loaded PLA-PEG nanoparticles were highly loaded and useful for treating intracranial glioblastoma by intravenous injection, in vitro studies demonstrated that the drug was released rapidly once nanoparticles were exposed to an aqueous environment. Presumably, this rapid release occurred because quisinostat was only associated with the surface of the nanoparticle, instead of being embedded within the core.

In this Example, Applicant sought to develop β-cyclodextrin-poly (β-amino ester) (cyclodextrin networks, or CDNs) for delivery of HDAC inhibitors. Applicants hypothesized that the common ionizable moiety in HDAC inhibiting molecules could be leveraged to achieve an effective, generalizable strategy for loading this class of agents into nanoparticles and enabling sustained release. To test this hypothesis, Applicant describes the development of a small library of CDNs materials that self-assemble into drug loaded nanoparticles. Applicant predicted that dual loading via both ionic and hydrophobic interactions would confer favorable characteristics for sustained release. Two uniquely surface functionalized (Aminated and PEGylated) versions of CDNs were generated via simple three component Michael addition reactions. Three subtypes of the Amine-CDN were developed, each with a successively increasing and flexible hydrophobic core, to obtain a total of four unique CDN structures.

HDAC inhibitors (panobinostat, quisinostat, dacinostat, givinostat) and other small, hydrophobic molecules (bortezomib, camptothecin, nile red) were passively doped into the resultant particles. Some of these particles possess biophysical properties favorable for drug delivery applications, such as small size, close to neutral surface charge, and very high loading (up to ~25%). Detailed structure-property investigation revealed that the key structural aspects of CDNs enabling self-assembly and effective loading include cross linker length, surface charge density, and the accessibility of the hydrophobic cyclodextrin core. Applicant observed that the encapsulated molecule needed to be ionizable with a flexible core to enable effective loading in CDNs. Applicant expect that the high HDACi loading within CDNs could be generalized to other molecules bearing similar ionizable structural moieties. Thus, the nanoparticle platform described in this Example offers new opportunities for nanomedicine development to deliver HDACi and other ionizable agents.

Example 1.2. Cyclodextrin Network (CDN) Architectures

Figures 1B, 2A:
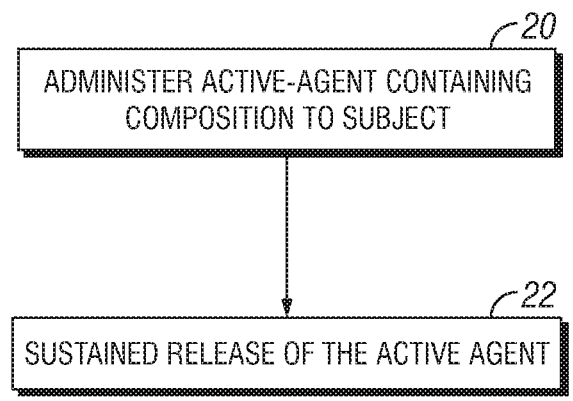
FIG. 1B illustrates a method for administration and sustained release of an active agent by utilizing the compositions of the present disclosure.
FIGS. 2A, 2B, and 2C illustrate that drug-empty cyclodextrin networks (CDNs) self-assemble into nanoparticles.
Figure 2B:
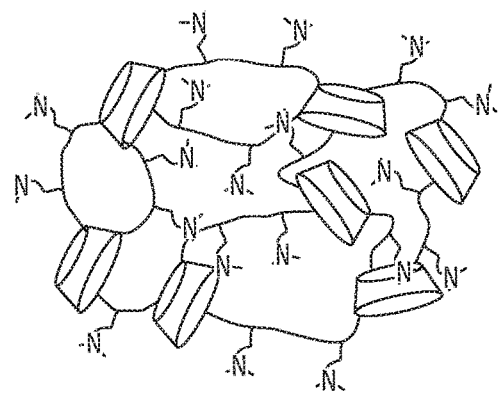
Figure 2B:
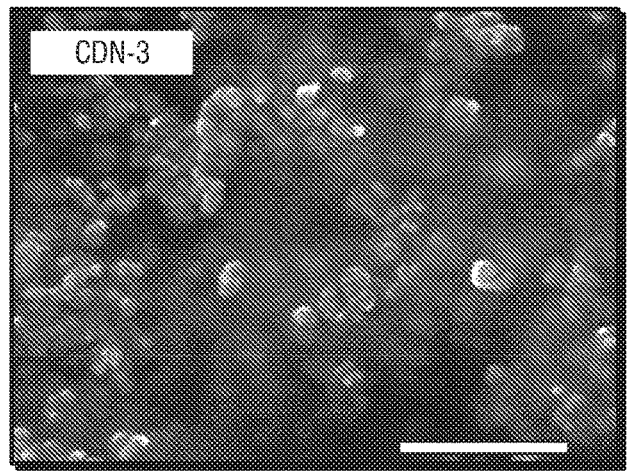
Figure 2C:
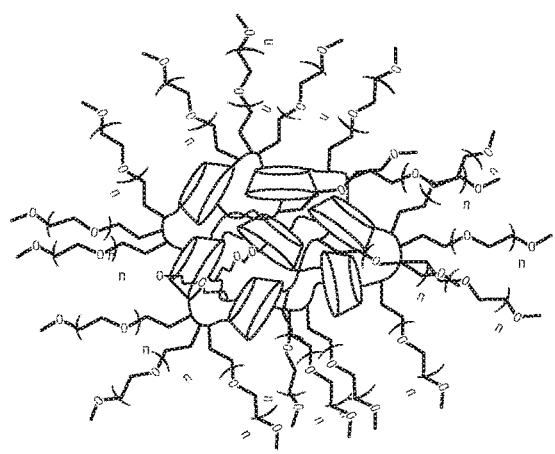
Figure 2C:
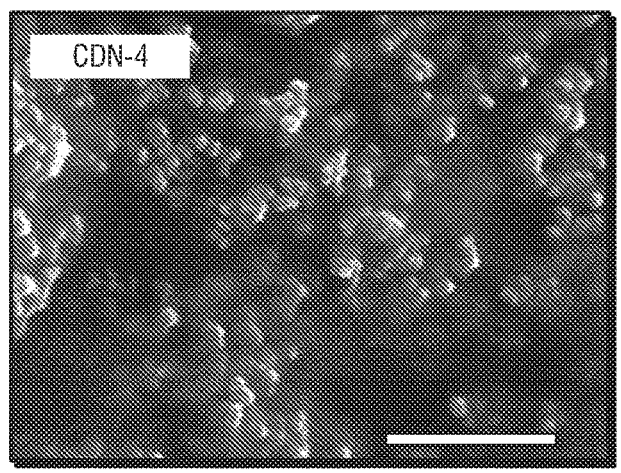

FIGS. 2A-2C illustrate that drug-empty CDNs self-assemble into nanoparticles. FIG. 2A shows a table displaying the mean size, polydispersity index (PDI) and zeta-potential for drug-empty nanoparticles formed by CDN-1, 2, 3 & 4.

FIG. 2B shows an SEM image of representative Amine-CDN-3. FIG. 2C shows an SEM image of representative CDN-4, which bears mPEG$_{550}$ surface functionality. Scale bars=1 μm. Errors are reported as standard deviations of at least three independently formulated batches.

β-cyclodextrin-poly (β-amino ester) nanoparticles were previously reported as a blood-brain barrier (BBB) permeable platform to support sustained release of doxorubicin (CDN-1). Here, Applicant expanded on this work to develop a library of materials possessing different cross-linker concentration, length, and amine functionalities (CDN-2, CDN-3, and CDN-4, respectively). This library was designed to study the complex structure-function relationships between loading of small molecules and network compositions. The 1,4-butanediol diacrylate cross-linker was employed at two different concentrations (1.3 mmol [1.0 eqv] and 2.7 mmol [2.0 eqv] for CDN-1 and CDN-2, respectively), whereas CDN-3 was synthesized from 1,6-hexanediol diacrylate (2.7 mmol, [2.0 eqv]). CDN-4 was synthesized from mPEG$_{550}$-Amine with 1,4-butanediol diacrylate cross-linker (2.7 mmol, [2.0 eqv]). Synthesis of materials with expected chemical structure was confirmed by NMR, while the nanoparticle formation was determined by DLS and SEM images.

The overall structure and biophysical characterization of the CDNs without any encapsulated payload are elucidated in FIGS. 2A-2C. Comparing CDN-1 against CDN-2, the latter has more surface-amine functionalities than the former. CDN-2 also has an expanded and flexible hydrophobic core. CDN-3 possesses a greater cross-linked length but self-assembles into smaller sized nanoparticles than CDN-1&2. Lastly, CDN-4 possesses a PEG modified surface, which Applicant expects will confer favorable properties for in vivo application.

Example 1.3. Panobinostat Loaded CDNs

To assess drug loading capacity in CDNs, Applicant first focused on the HDAC inhibitor panobinostat (LBH589). Panobinostat is a pan-HDACi that is of interest for treatment of a multitude of diseases, including solid and hematological cancers, neuroinflammation, and traumatic brain injury. Like other HDACi, panobinostat experiences several delivery challenges that are expected to reduce its therapeutic potential. First, panobinostat is poorly water soluble and difficult to administer in free form. Second, both peripheral and central pharmacokinetic analyses show that it is cleared rapidly from fluid compartments. Applicant therefore focused on panobinostat as a candidate molecule for nanoparticle delivery based on the expectation that solubilization within a carrier system could provide important enhancements in drug bioavailability within target tissues.

Panobinostat-loaded nanoparticles were formulated by doping a given concentration of the drug with CDN in 2.5 vol % DMSO-aqueous medium. Panobinostat was added at 5 different theoretical loadings, and the amount of panobinostat incorporated into the network after thorough washing was quantified by absorbance.

Panobinostat incorporated effectively into all four CDNs. However, drug loading was found to vary starkly for the different structural variations of the networks, with both the diacrylate cross-linkers and the functionality of the amine affecting drug loading capacity. Drug loading increased across CDNs 1-3, which was associated with a larger and more flexible hydrophobic core of the nanoparticles imparted by the hexyl cross-linkers (CDN-3). Loading was significantly higher in CDN-4 compared to other nanoparticles. High loading of panobinostat in CDN-4 is consistent with Applicant's prior report of favorable interaction of ionized quisinostat with PEG present at the surface of polyester nanoparticles. To better understand the mechanisms by which drug incorporates into the CDN network, Applicant engaged in detailed biophysical characterization of each formulation.

Figure 3:
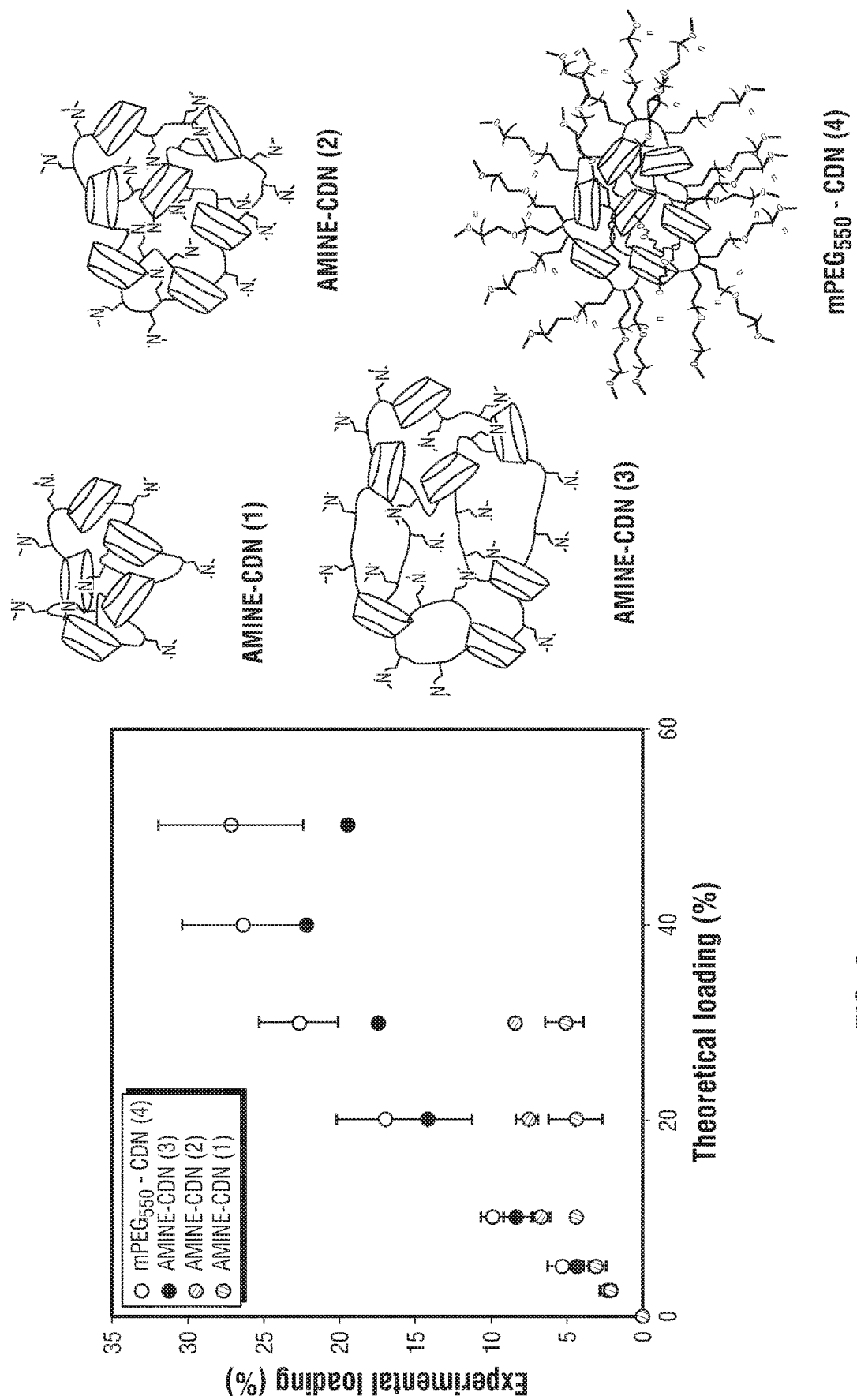
FIG. 3 illustrates a plot of measured panobinostat loading for CDN-1, 2, 3 and 4 as a function of different theoretical loadings. Error bars show standard deviations of at least three independently formulated batches.

FIG. 3 illustrates a plot of measured panobinostat loading for CDN-1, 2, 3 and 4 as a function of different theoretical loadings. Error bars show standard deviations of at least three independently formulated batches.

The maximum panobinostat loading achieved for CDN-1 was approximately 5%, and the experimental drug loading did not increase with additional drug. Nanoparticles produced from panobinostat loaded CDN-1 were micron-sized, as evident from the DLS size measurements. The zeta potential of the particles was found to increase linearly with increasing drug loading. The larger size is likely due to the formation of particle or drug aggregates and eventual network collapse at increasing drug concentration. The linear increase in zeta-potential can be explained based on an acid-base interaction between the drug (hydroxamic acid) and the surface-amine functionalities (Lewis base). Thus, CDN-1 could incorporate panobinostat in the micron range but did not self-assemble into stably condensed nanoparticles.

Figure 4A:
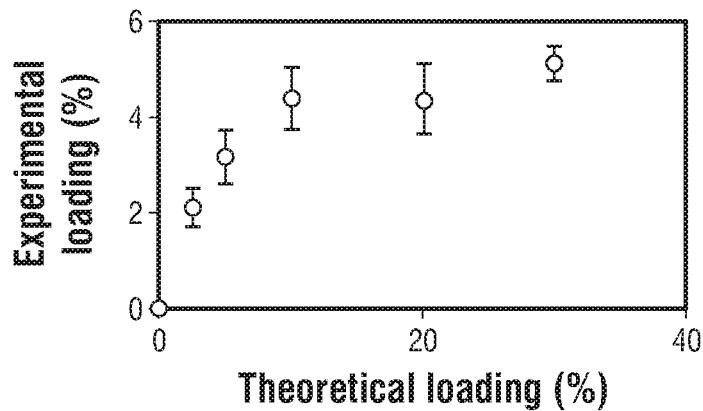
FIGS. 4A, 4B, and 4C illustrate plots of average experimental loading (FIG. 4A), average zeta-potential (FIG. 4B), and mean hydrodynamic size (FIG. 4C) of CDN-1 nanoparticles against theoretical loading of panobinostat.
Figure 4B:
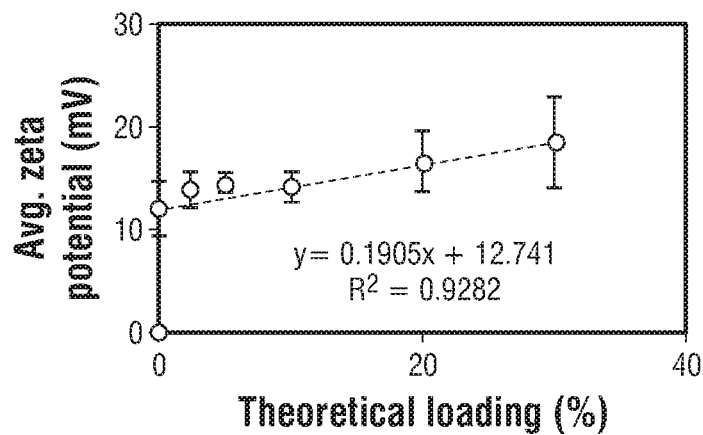
Figure 4C:
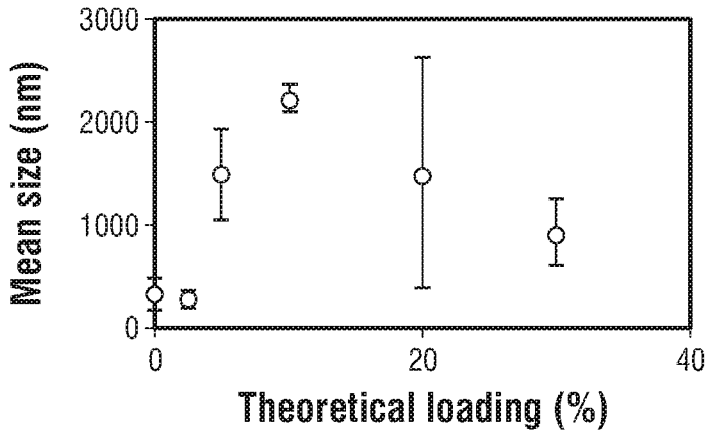
Figure 4D:
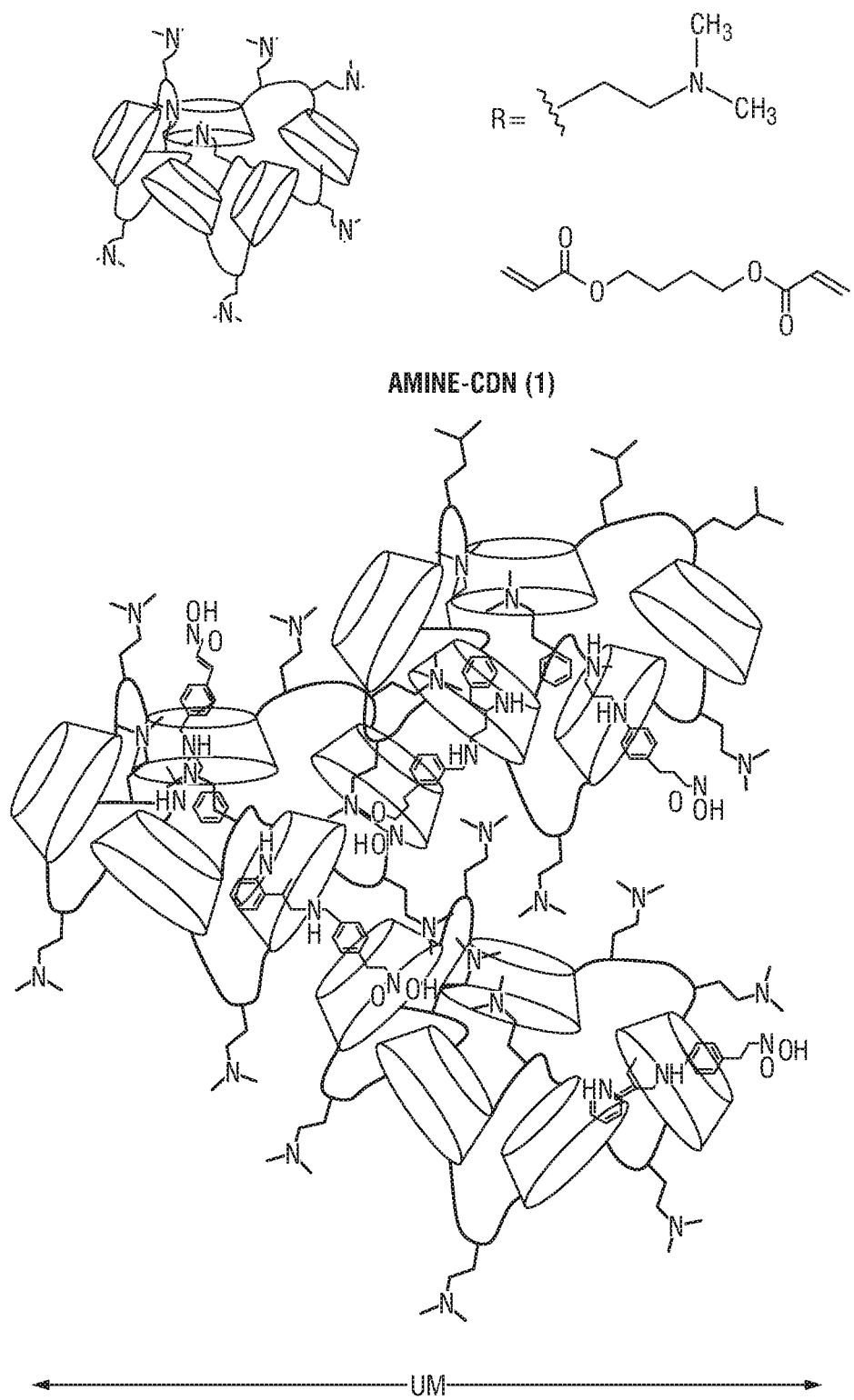
FIG. 4D illustrates aggregate formation as a mechanism of drug stabilization by the CDN-1 nanoparticles. Error bars show the standard deviation of three separate batches.

FIGS. 4A-4C illustrate plots of average experimental loading (FIG. 4A), average zeta-potential (FIG. 4B), mean hydrodynamic size (FIG. 4C) of CDN-1 nanoparticles against theoretical loading of panobinostat. FIG. 4D illustrates aggregate formation as a mechanism of drug stabilization by the CDN-1 nanoparticles. Error bars show the standard deviation of three separate batches.

Upon increasing the hydrophobic core of the network in CDN-2, experimental loading for panobinostat was found to increase up to approximately 8%. This increase in drug loading was associated with a steady rise in zeta potential for up to 5% theoretical loading and a steady increase in particle size with increasing drug incorporation. While the same acid-base interaction of the drug and surface amine functionalities holds true in this case, Applicant speculates that a larger hydrophobic core assists in stabilizing the increasing amount of drug in the network as compared to CDN-1 as drug incorporation exceeds 5%. Thus, CDN-2 was capable of self-assembling into relatively stable nanoparticles with loading capacity saturating at ~8%.

Figure 5A:
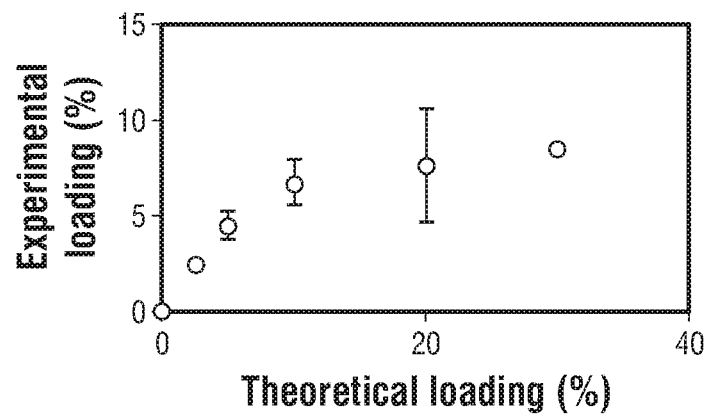
FIGS. 5A, 5B, and 5C illustrate plots of average experimental loading (FIG. 5A), average zeta-potential (FIG. 5B), and mean hydrodynamic size (FIG. 5C) of CDN-2 nanoparticles against theoretical loading of panobinostat.
Figure 5B:
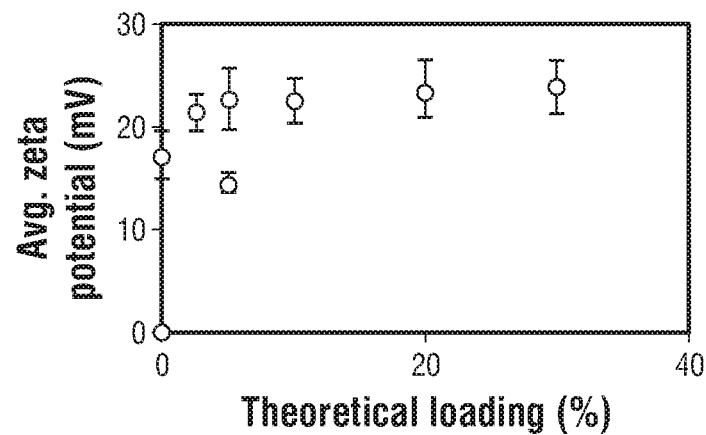
Figure 5C:
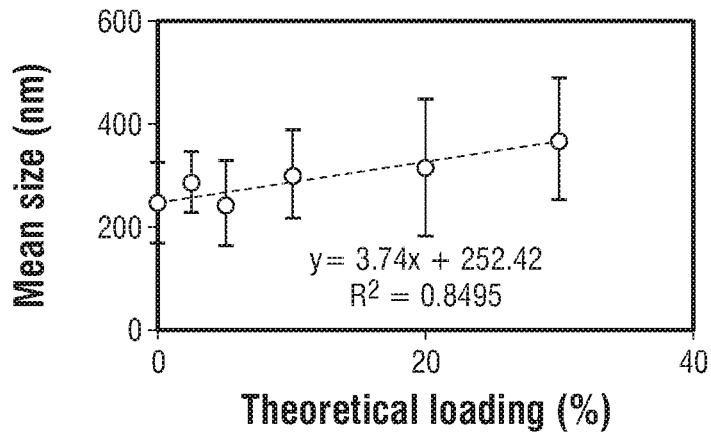
Figure 5D:
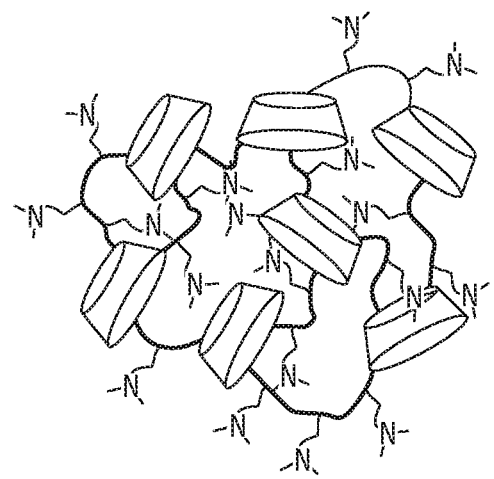
FIG. 5D shows stable drug-nanoparticle interactions. Error bars show the standard deviation of three separate formulations.
Figure 5D:
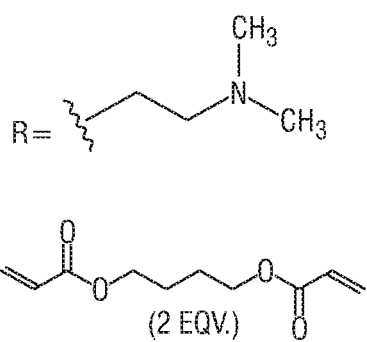
Figure 5D:
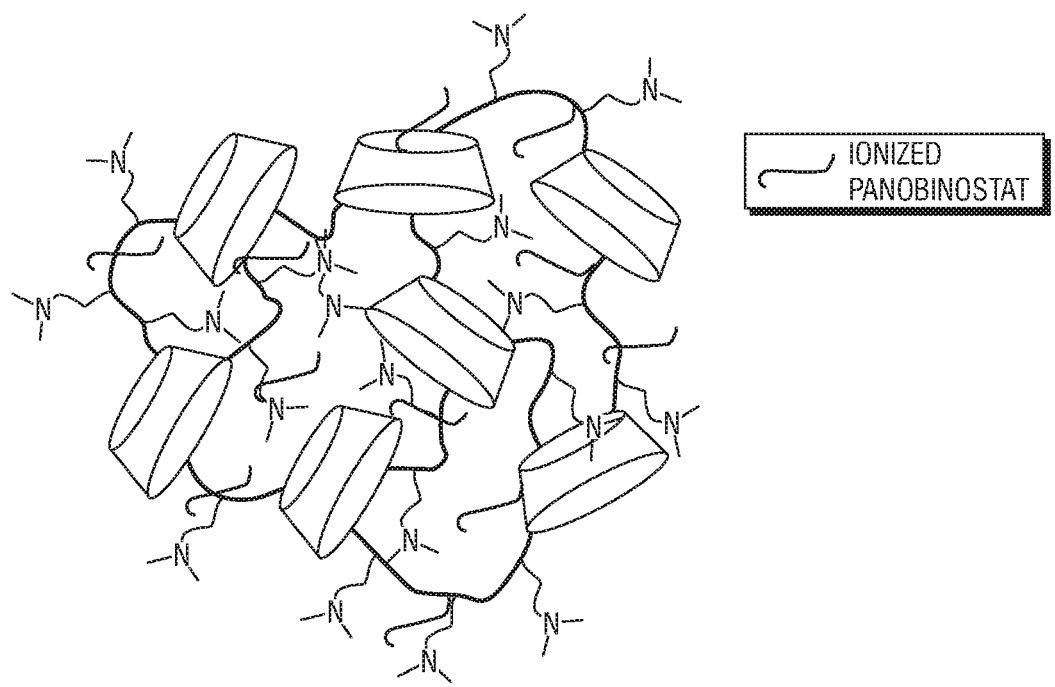

FIGS. 5A-5C illustrate plots of average experimental loading (FIG. 5A), average zeta-potential (FIG. 5B), and mean hydrodynamic size (FIG. 5C) of CDN-2 nanoparticles against theoretical loading of panobinostat. FIG. 5D shows stable drug-nanoparticle interactions. Error bars show the standard deviation of three separate formulations.

CDN-3 employing a longer length cross-linker (1,6-hexanediol diacrylate) that enabled self-assembly of polymer and drug into much smaller and more consistently sized nanoparticles than CDN-1 or CDN-2. Presumably, this increased stability is due to the more flexible network with a more hydrophobic core that can accept increasing quantities of drug. Zeta potential was observed to increase as loading increased. Interestingly, aqueous diameter was observed to increase for nanoparticles formed from CDN-3 with a 5% theoretical loading compared to other loadings. This observation of an outlying high diameter at 5% theoretical loading was reproducible in at least three independent experimental replicates. This could likely be ascribed to cyclodextrin-drug complexation at lower theoretical loadings owing to an expanded hydrophobic core, which facilitates easier access to the cyclodextrin units.

Figure 6A:
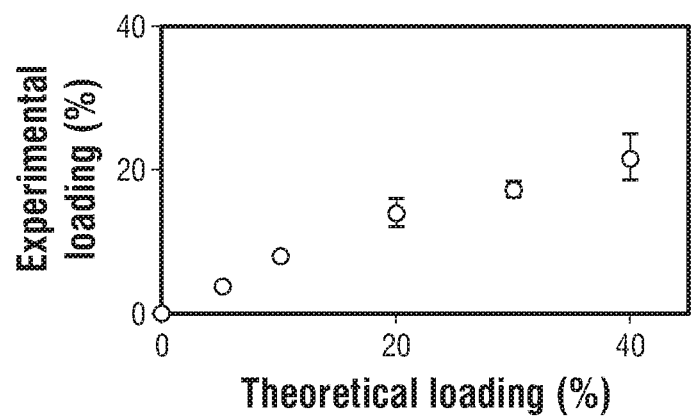
FIGS. 6A, 6B, and 6C illustrate plots of average experimental loading (FIG. 6A), average zeta-potential (FIG. 6B), and mean hydrodynamic size (FIG. 6C) of CDN-3 nanoparticles against theoretical loading of panobinostat.
Figure 6B:
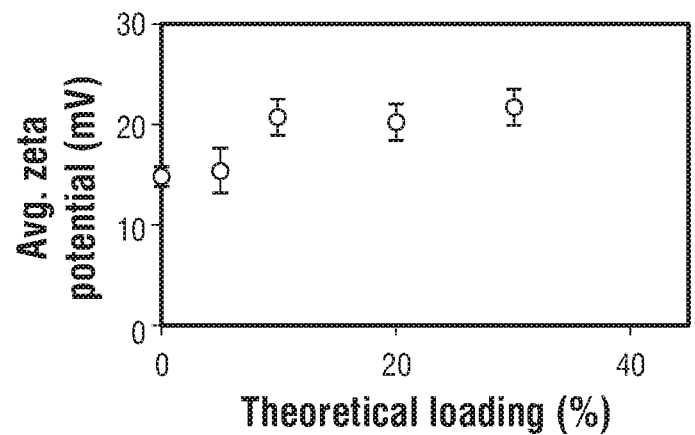
Figure 6C:
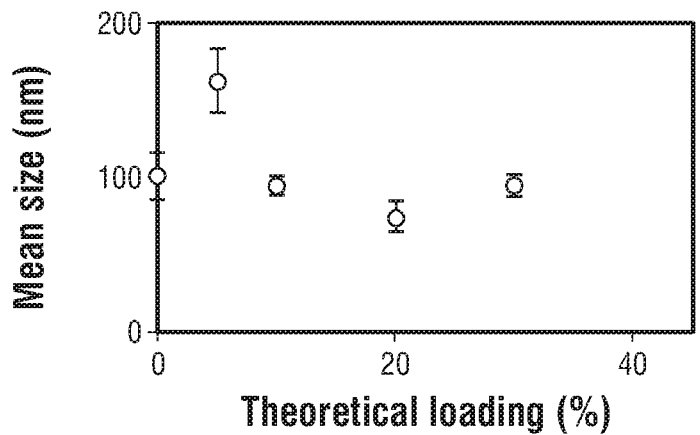
Figure 6D:
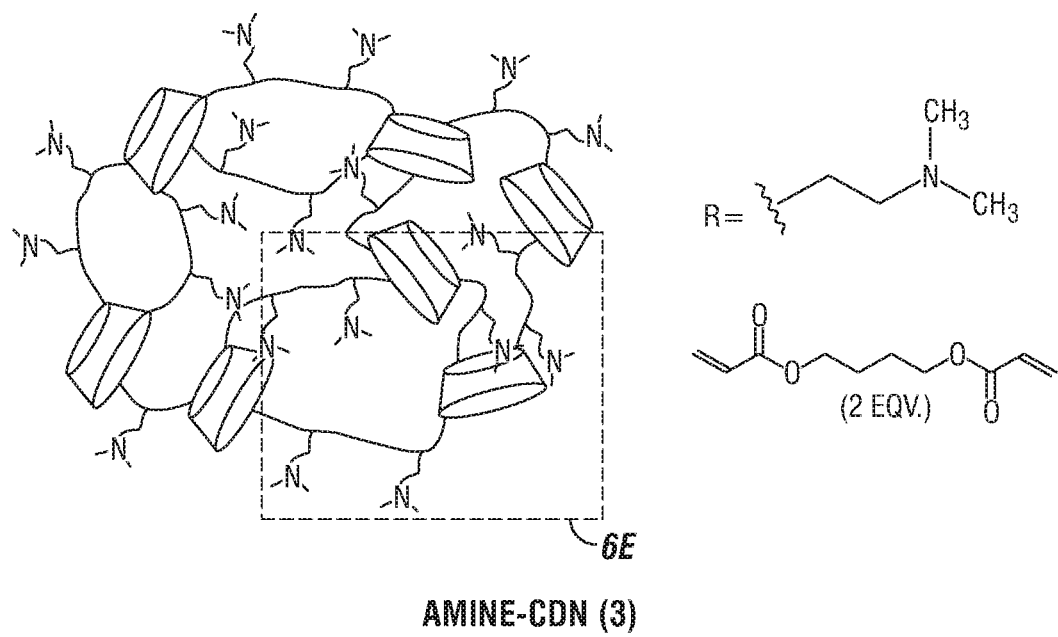
FIG. 6D shows hydrophobic core stabilizing drug complexation with cyclodextrin cavity.
Figure 6E:
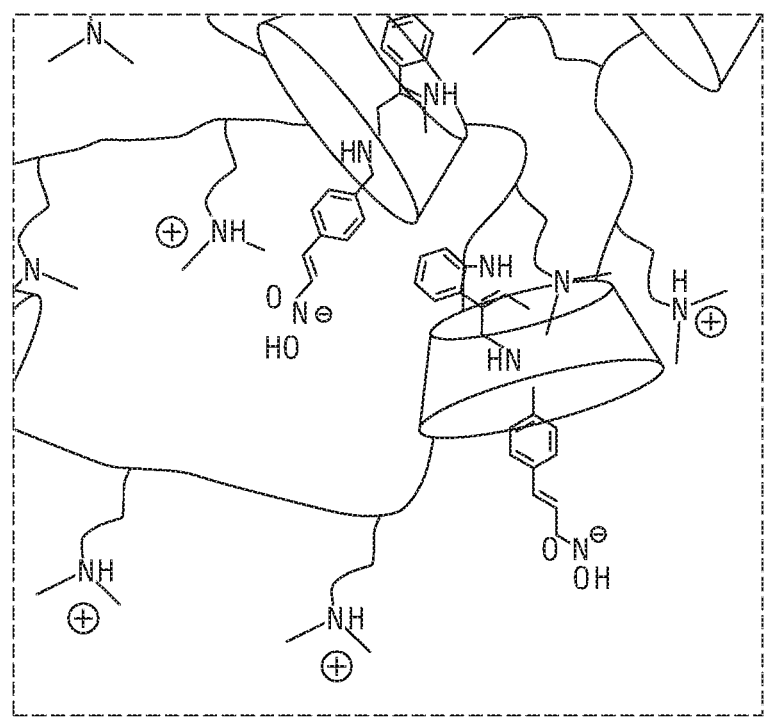
FIG. 6E shows an expanded hydrophobic core stabilizing drug complexation with cyclodextrin cavity from FIG. 6D. Error bars show the standard deviation of three separate formulations.
Figure 7A:
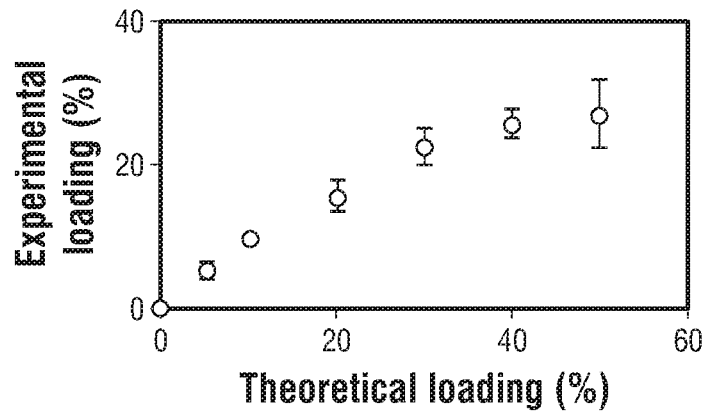
FIGS. 7A, 7B, and 7C illustrate plots of average experimental loading (FIG. 7A), average zeta-potential (FIG. 7B), and mean hydrodynamic size (FIG. 7C) of CDN-4 nanoparticles against theoretical loading of panobinostat.
Figure 7B:
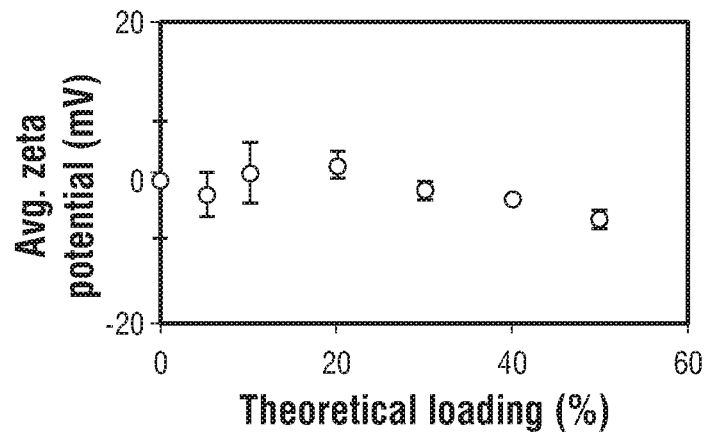
Figure 7C:
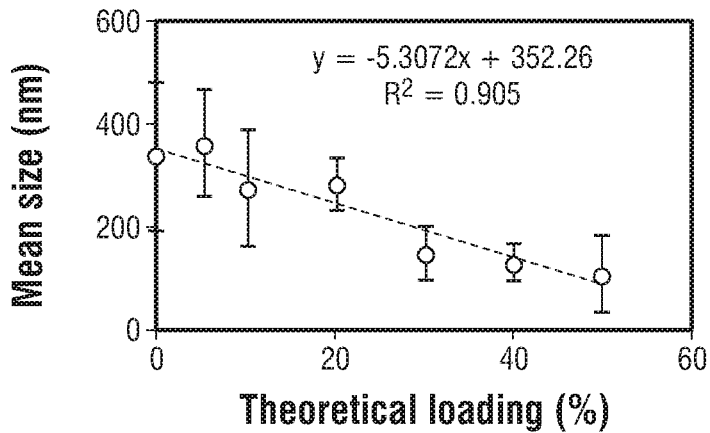
Figure 7D:
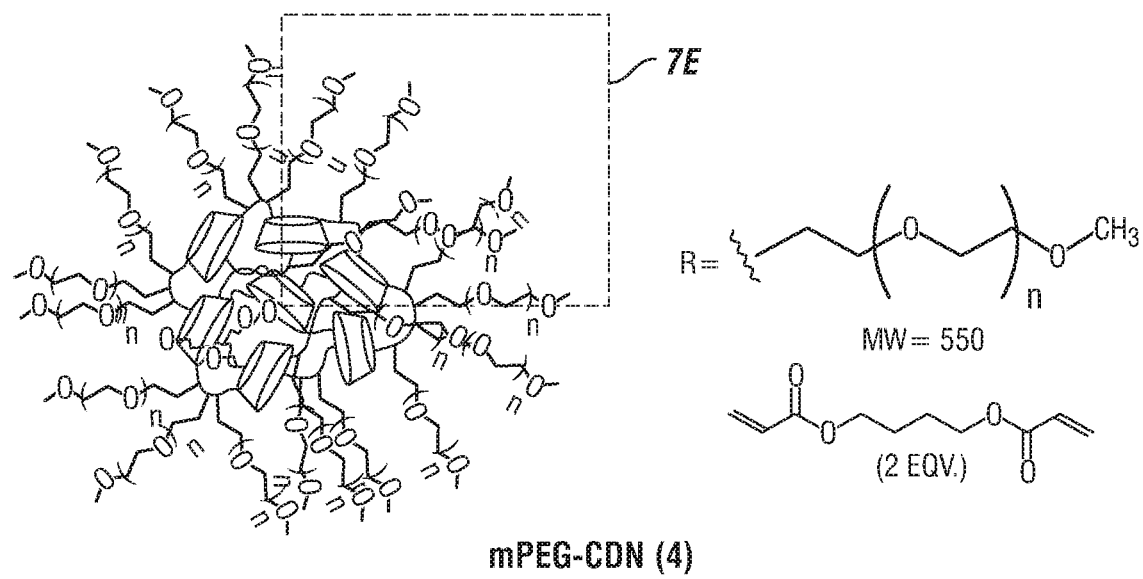
FIG. 7D shows mPEG$_{550}$-drug interaction stabilizing higher loaded CDN-4 nanoparticles.
Figure 7E:
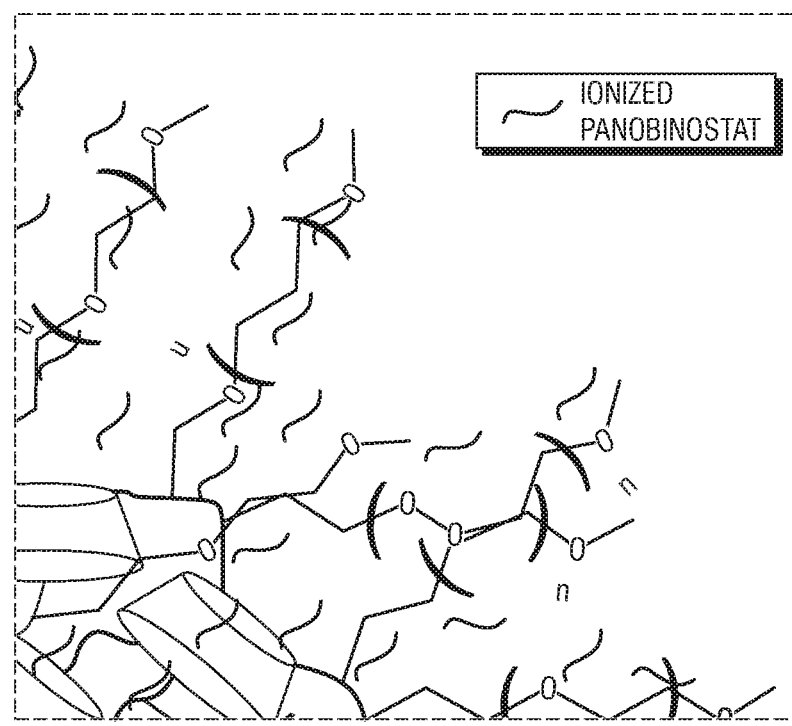
FIG. 7E shows an expanded view from FIG. 7D. Error bars show the standard deviation of three separate formulations.
Figure 8A:
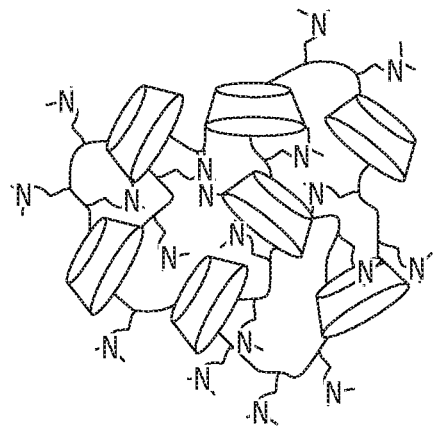
FIGS. 8A, 8B, 8C, 8D, and 8F illustrate controlled release of panobinostat loaded CDN samples for 5% (w/w) (FIG. 8A) and 30% (w/w) (FIG. 8B) theoretically loaded CDN-2 samples; 5% (w/w) (FIG. 8C) and 20% (w/w) (FIG. 8D) theoretically loaded CDN-3 samples; and 5% (w/w) (FIG. 8E) and 20% (w/w) (FIG. 8F) theoretically loaded CDN-4 samples. Error bars are reported as the standard deviation of at least two separate measurements.
Figure 8A:
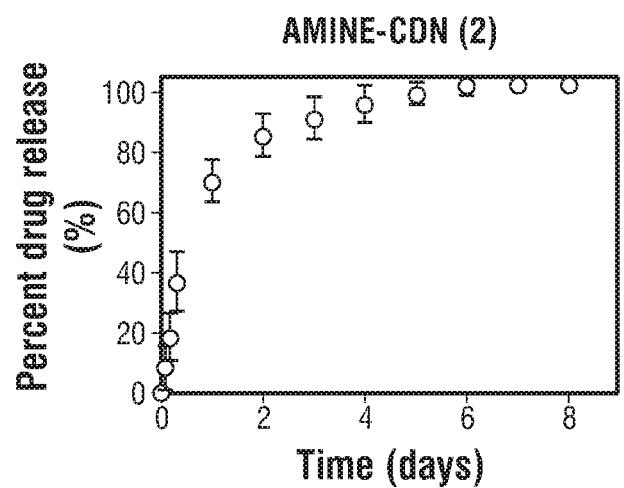
Figure 8B:
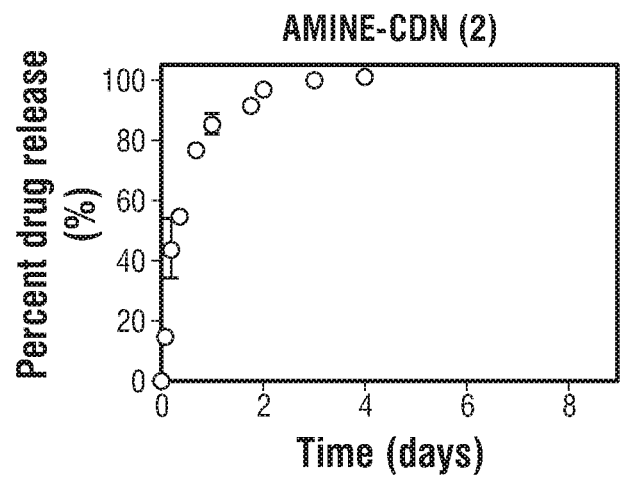
Figure 8C:
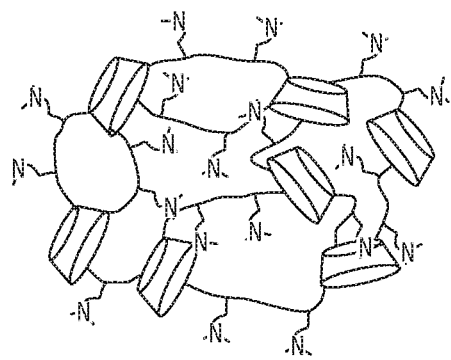
Figure 8C:
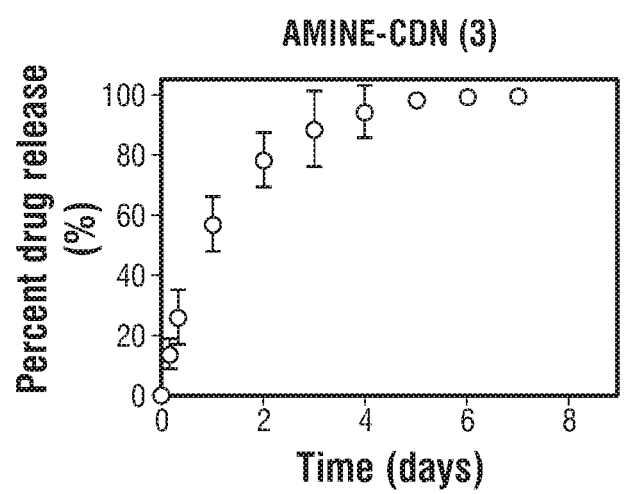
Figure 8D:
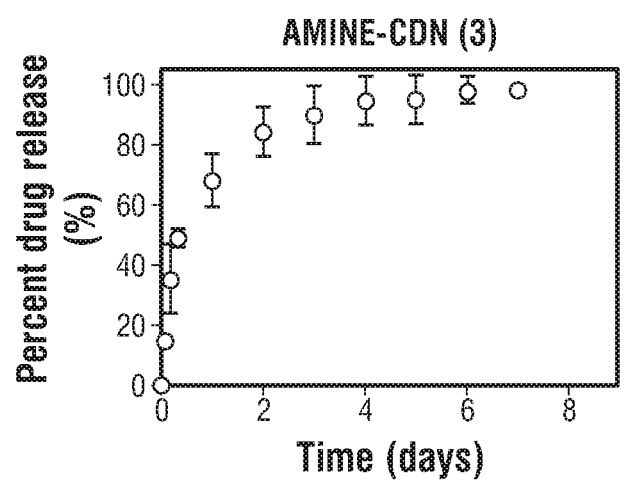
Figure 8E:
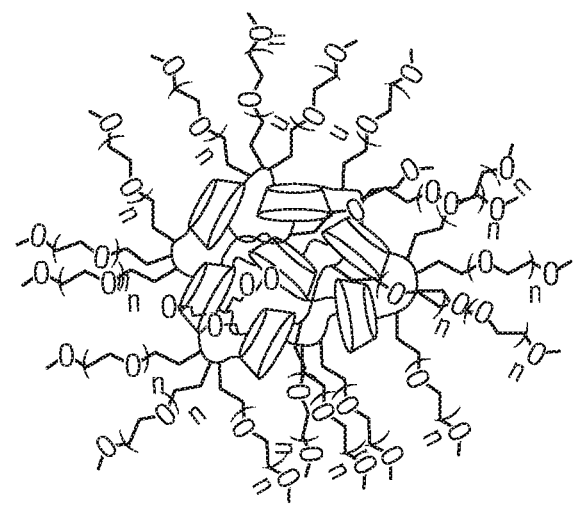
Figure 8E:
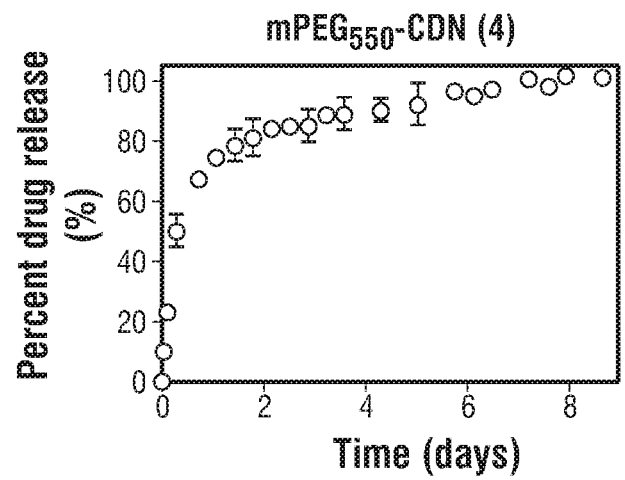
Figure 8F:
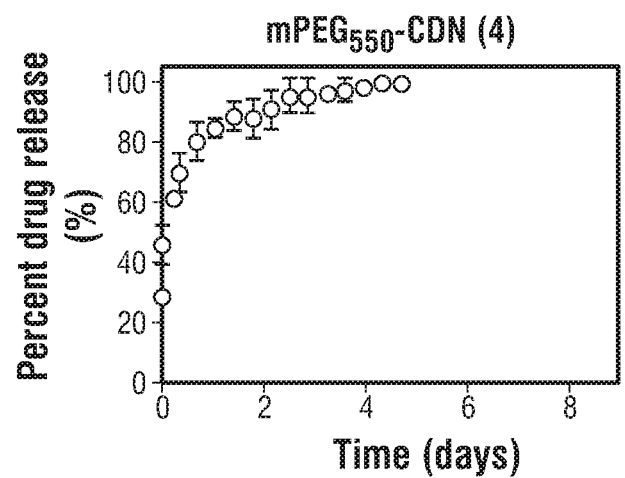

FIGS. 6A-6C illustrate plots of average experimental loading (FIG. 6A), average zeta-potential (FIG. 6B), and mean hydrodynamic size (FIG. 6C) of CDN-3 nanoparticles against theoretical loading of panobinostat. FIG. 6D shows a hydrophobic core stabilizing drug complexation with cyclodextrin cavity, and FIG. 6E shows an expanded hydrophobic core stabilizing drug complexation with cyclodextrin cavity from FIG. 6D. Error bars show the standard deviation of three separate formulations.

CDN-4, synthesized with mPEG$_{550}$-amine, exhibited the highest extent of panobinostat incorporation, with measured loading of up to ~30%. This high level of experimental loading was achieved at the cost of encapsulation efficiency (50% theoretical loading). The particle size was found to decrease steadily with increased drug loading, while the near-neutral zeta-potential decreased slightly with increasing drug loading. This is likely due to the association of ionized panobinostat molecules with the mPEG$_{550}$ shell of the particles (FIGS. 6D and 6E).

FIG. 7 illustrate a plot of average experimental loading (FIG. 7A), average zeta-potential (FIG. 7B), mean hydrodynamic size (FIG. 7C) of CDN-4 nanoparticles against theoretical loading of panobinostat. FIG. 7D shows mPEG$_{550}$-drug interaction stabilizing higher loaded CDN-4 nanoparticles, and FIG. 7E shows an expanded view from FIG. 7D. Error bars show the standard deviation of three separate formulations.

Comparison of the loading, size, and surface charge of particles formed by these different CDNs for a single encapsulated drug yields insight into the mechanisms of loading and self-assembly that enables such a high degree of drug incorporation. For CDNs 1-3 (amine functionalized CDNs), the zeta potential was observed to increase with increased drug loading. This observation supports an ionic interaction of panobinostat with surface-exposed amine groups. Comparing CDN-1, CDN-2, and CDN-3, the experimental drug loading was found to increase with an expansion of the predicted size of hydrophobic core of the nanoparticles, supporting additional hydrophobic interactions as being significant for loading drug and promoting self-assembly. These hydrophobic interactions likely explain the aggregate formation in CDN-1, which can be contrasted with the stability of nanoparticles formed by CDN-2 & 3 that possess greater capacity to incorporate drug. The very high loading of panobinostat in nanoparticles formed by CDN-4 (mPEG$_{550}$ functionalized) suggests an interaction of panobinostat with the mPEG$_{550}$ outer shell, which could be a similar loading mechanism as what Applicant has previously demonstrated for the HDAC inhibitor quisinostat in polyester nanoparticles. The near-neutral zeta potential of these particles precludes the possibility of an acid-base interaction between panobinostat and the particle surface. Applicant therefore attributes the drug-loading induced negative zeta potential to the alignment of ionized drug molecules aligning along the mPEG$_{550}$ exterior shell of the particle. This drug-polymer interaction would account for the substantially higher drug loading (and minimal saturation) observed for CDN-4.

FIGS. 8A-8F illustrate controlled release of panobinostat loaded CDN samples for 5% (w/w) (FIG. 8A) and 30% (w/w) (FIG. 8B) theoretically loaded CDN-2 samples; 5% (w/w) (FIG. 8C) and 20% (w/w) theoretically loaded CDN-3 samples (FIG. 8D); and 5% (w/w) (FIG. 8E) and 20% (w/w) (FIG. 8F) theoretically loaded CDN-4 samples. Error bars are reported as the standard deviation of at least two separate measurements.

The controlled release of panobinostat was studied for two different experimental loadings of formulations with CDN-2, 3 & 4 in PBS at 37° C. Controlled release from CDN-1 was not studied due to the large size of resultant particles, which makes it unsuitable for in vivo application. All CDNs provided effective controlled release, with release times ranging between 5 and 24 days for different CDN structures. CDN-4 was found to have the slowest release kinetics in comparison to CDN-2 & 3, presumably due to slowed diffusion of panobinostat through the PEG layer. Experimental loading was observed to affect controlled release for CDN-2 & 4.

For instance, highly loaded CDN-2 was observed to completely release panobinostat within 4 days (FIG. 8B) as compared to 8 days (FIG. 8A) for the less highly loaded formulation. Similarly, highly loaded CDN-4 was found to completely release panobinostat within 13 days (FIG. 8F) as compared to 21 days for the less highly loaded formulation. The apparently slower release kinetics for less highly loaded particles for CDN-2 & 4 suggests that drug may exhibit a greater surface association when particles are very highly loaded. In contrast, CDN-3 in contrast exhibits similar release kinetics for both higher and lower drug loaded samples, signifying the role of an expanded hydrophobic core in enabling stable incorporation of larger quantities of drug.

Example 1.4. Application of Panobinostat Loaded CDNs In Vitro and In Vivo

Figure 9A:
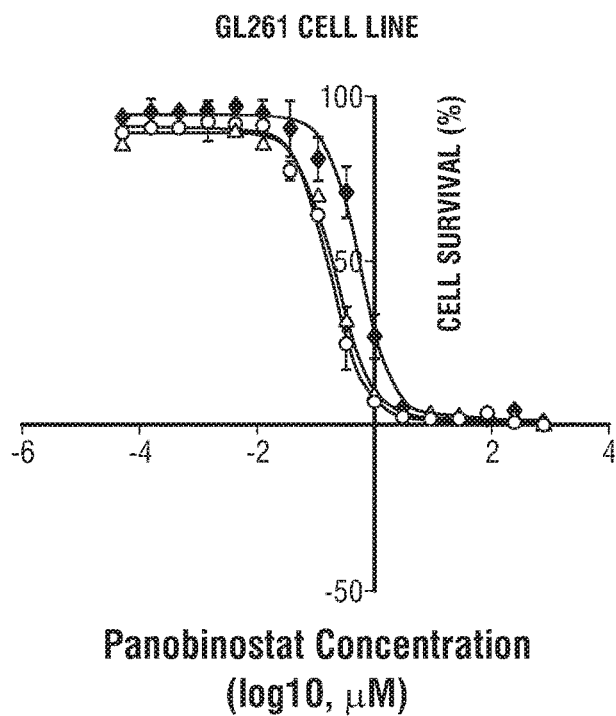
FIG. 9A illustrates in-vitro GL261 cell viability assay for panobinostat loaded CDN-4 formulation. IC$_{50}$ values after 72 hours of incubation: free Pb=0.17 μM; CDN(4)-Pb=0.56 μM, and non-CDN-formulated Pb=0.23 μM. Freely solubilized panobinostat is abbreviated as Pb.
Figure 9C:
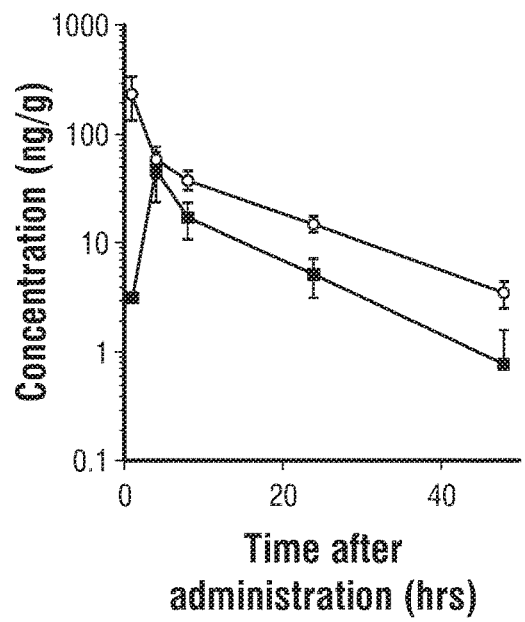
FIG. 9C demonstrates the bioavailability of the drug in CNS, confirmed by pharmacokinetic studies.
Figure 9B:
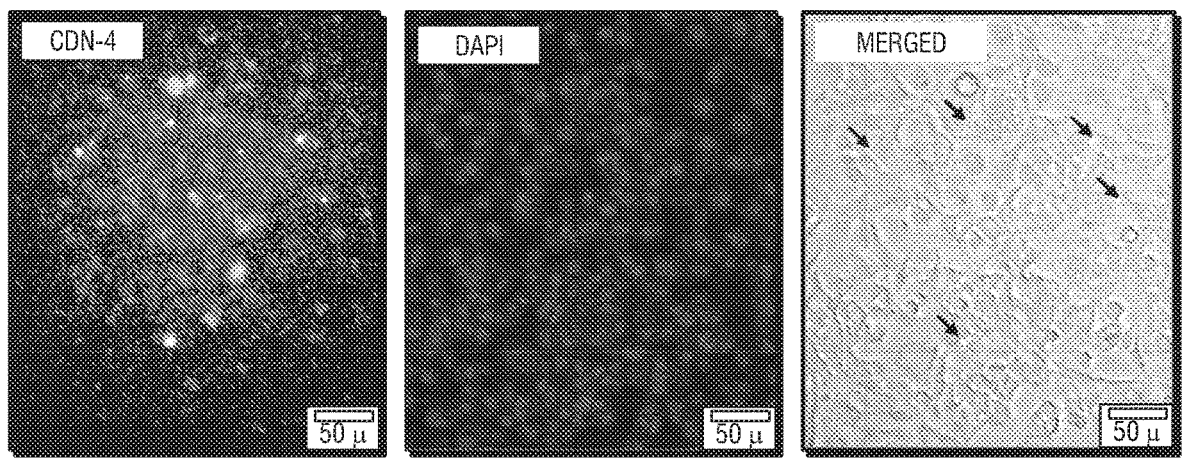
FIG. 9B illustrates the association of BODIPY dye labeled CDN-4 to GL261 cells confirmed via fluorescence microscopy.
Figure 10A:
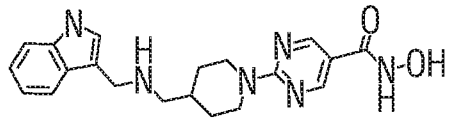
Figure 10A:
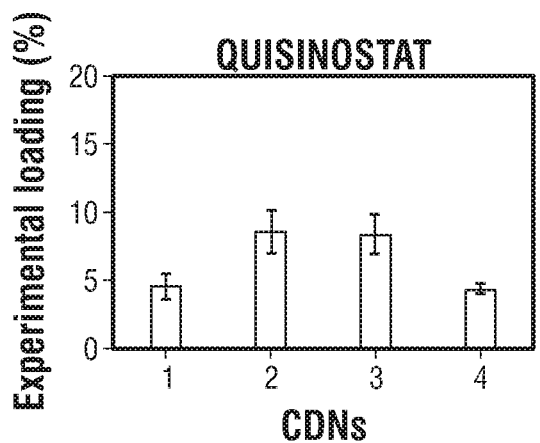
Figure 10B:
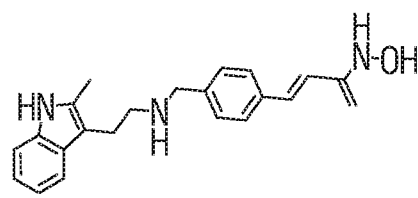
Figure 10B:
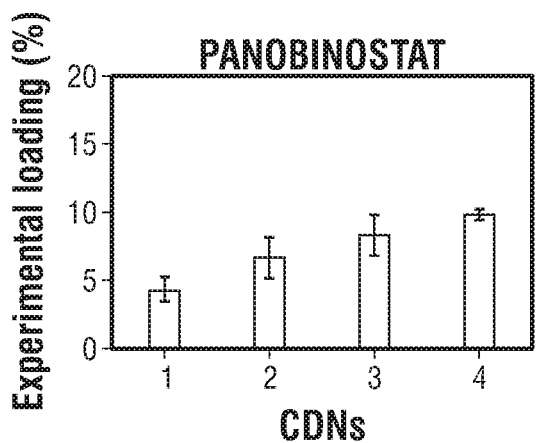
Figure 10C:
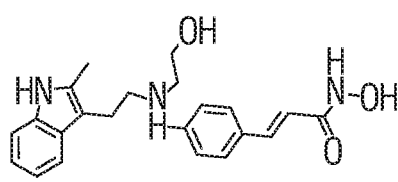
Figure 10C:
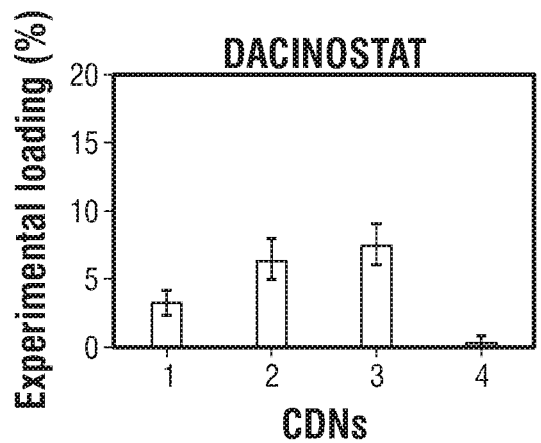
Figure 10D:
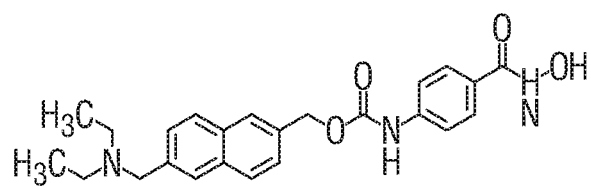
Figure 10D:
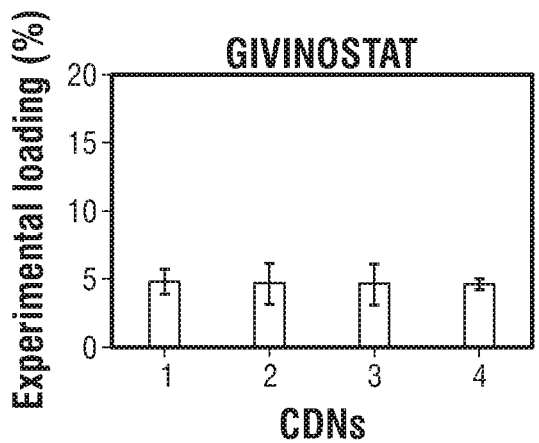

FIGS. 9A-9C illustrate in vitro GL261 cell viability assay for panobinostat loaded CDN-4 formulation. IC$_{50}$ values after 72 hours of incubation: free Pb=0.17 µM; CDN(4)–Pb=0.56 µM, and non-CDN-formulated Pb=0.23 µM. Freely solubilized panobinostat is abbreviated as Pb.

The zeta potential of colloidal materials plays a role in how particles interact with tissues and cells, governing bio-distribution, cellular uptake, and drug lifespan in vivo. Tumor cell membranes tend to be more negative in charge than healthy cells, which some investigators have utilized for the purposes of targeting nanoparticle delivery. However, less negative surface charges can promote nonspecific cellular uptake or be plagued by aggregation due to absorption of plasms proteins.

As an alternative strategy, PEGylation of nanoparticles can improve their plasma half-life and shield the encapsulated drug during circulation, which can increase the drug's lifespan. Thus, to move towards assessment of nanoparticle CDNs for drug delivery, Applicant focused on CDN-4, which bears a PEGylated surface as well as size and surface charge that are expected to be compatible for effective delivery in vivo. Bioactivity of panobinostat loaded CDN-4 was evaluated in GL261 cells, which are a murine glioblastoma line. Following 72 hours of incubation, free panobinostat exhibited an IC$_{50}$ value of 0.17 µM while panobinostat loaded CDN-4 resulted in IC$_{50}$ values of 0.56 µM, respectively (FIG. 9A).

To test whether panobinostat loses activity during formulation, Applicant subjected panobinostat without CDN materials to the complete formulation process and assessed IC$_{50}$. Non-CDN formulated panobinostat possessed an IC$_{50}$ value of 0.23 µM. When BIODIPY-labeled CDN-4 nanoparticles were incubated with cells for 48 hours, perinuclear fluorescence signal was observed, confirming that nanoparticles effectively interact with and are internalized by cells (FIG. 9B). The drug loading studies described above provide evidence that panobinostat loads well into the cyclodextrin-containing core of CDN-4 and is released very slowly. Thus, the apparent increase in $IC_{50}$ observed for panobinostat loaded into CDN-4 likely represents a consequence of controlled release.

Increased $IC_{50}$ following drug encapsulation due to reduced cellular availability of encapsulated drug have been reported for other nanoparticle preparations. However, such nanoparticles do not necessarily represent a problem for in vivo development of these systems, since prolonged release will confer advantages in vivo that are not captured in cellular assays.

Applicant next sought to test whether incorporation of panobinostat into the CDN network would enable administration to aqueous tissue compartments. Applicant's laboratory is focused on the development of nanocarrier systems to the central nervous system (CNS) via direct administration to the cerebrospinal fluid (CSF) that bathes the brain and spinal cord. This particular mode of administration offers a number of advantages for CNS drug delivery, including achievement of high concentrations of drug in the CNS compartment while minimizing off-target tissue toxicity. Applicant first assessed the tolerability of panobinostat loaded CDNs in healthy mice following administration through the cisterna magna, identifying a maximum tolerated dose (MTD) of 960 ng for panobinostat loaded CDN-4 nanoparticles. Above this dosing level, mice exhibited reversible neurological symptoms and weight loss. Pharmacokinetic assessments confirmed bioavailability of panobinostat in the CNS following direct delivery of 560 ng from panobinostat loaded CDN-4 nanoparticles to the CSF (FIG. 9C).

Particle systems delivered directly to cerebrospinal fluid (CSF) are not expected to penetrate the parenchyma in large quantities, although drug is expected to be delivered passively from the subarachnoid space into CSF exposed tissues. Pharmacokinetic assessments were therefore performed on specific CNS tissue regions instead of bulk brain homogenate. One hour after administration, panobinostat levels reached 243 ng/g in the brainstem/cerebellum, clearing slowly to reach a concentration of 3.6 ng/g after 48 hours. Panobinostat concentration was initially low in the upper spinal cord, reaching 183 ng/g 4 hours after administration and clearing thereafter. These data support redistribution of nanoparticles from the brain compartment into the spinal cord following cisternal administration.

Panobinostat was undetectable in plasma at any time point after delivery up to 48 hours (data not shown). These data confirm that encapsulation within CDN-4 nanoparticles enables delivery in vivo. Taken in sum, in vitro and in vivo work demonstrate that nanoparticles formed by CDN-4 can deliver bioactive panobinostat to cells and tissues.

Example 1.5. Library of Drug Loaded CDNs

Initial studies with panobinostat suggested that the loading mechanism includes both hydrophobic (within the cyclodextrin/polymer core) and ionic (possibly within the amine or PEG layer) interactions. Applicant predicted that these interactions would be useful for the encapsulation of other ionizable molecules.

To test this prediction, Applicant attempted to load other HDACis containing ionizable hydroxamic acids (quisinostat, dacinostat and givinostat), as well as non-polar molecules that are either non-ionizable (nile red), possess reduced ionization capacity (camptothecin), or contain an alternative ionizable boronic acid group (bortezomib). As a control hydrophilic drug, Applicant also attempted to encapsulate cytarabine with all the CDNs, but this yielded poor experimental loading (data not shown).

FIGS. 10A-10G illustrate average experimental drug loading values of various small molecules for CDN 1-4 for a theoretical loading of 10% (w/w). Molecular structures of compounds illustrating the hydrophobic (red) and ionizable (green) moieties are shown. Error bars are reported as the standard deviation of three separate formulations.

Drugs with ionizable moieties in their molecular structure (quisinostat, panobinostat, dacinostat, givinostat and bortezomib) loaded particularly well in CDNs 1-3, supporting the role of surface amine functionality enabling drug interaction via H-bonding (FIGS. 10A-10G). Drug-loading was found to increase from CDN-1 to CDN-3 for all the HDACis investigated except for givinostat (ITF2357).

Given that givinostat possess the bulkiest, inflexible hydrophobic end, these data support the role of a flexible hydrophobic core for effective encapsulation of drugs in CDNs. CDN-4 was found to selectively load all the HDACis and bortezomib except dacinostat. The molecular structures of all the quisinostat, panobinostat, givinostat, and bortezomib are relatively slender, flexible and polar. However, that of dacinostat (LAQ824) bears an ionizable (hydroxyl) offshoot midway throughout the molecule, which perturbs the hydrophobic end. Applicant speculates that the flexible, slender structures of these other HDAC inhibitors facilitate efficient association with the exterior $mPEG_{550}$ layer of the particle, which is not possible in the case of dacinostat owing to its steric incompatibility. These results highlight ionizability as being a factor for drug incorporation in particles formed from CDNs 1-3 and steric compatibility as being a requirement for drug loading into particles formed from CDN-4.

These Examples present a novel approach for generating nanoparticles that are highly loaded with HDACi drugs or other molecules bearing ionizable moieties. To Applicant's knowledge, the maximum reported HDACi loading in polymeric system is around 9%, which in turn is higher than most other lipid derived systems (~2.5-5.0%). The described particle system herein exhibits a maximum observed loading of ~25% in comparison, with a reasonably sustained rate of drug release (13-21 days).

All the tested HDACi could be loaded at a relatively high capacity in the CDN systems. Electrolyte/co-solvent induced ionic drug loading, and synthetic polymer constructs with ionizable moieties grafted on to the backbone have been widely reported as reliable ionic drug loading strategies. Nevertheless, the general utility of these strategies is questionable, as the choice of the inorganic salt/electrolyte is highly drug-specific. Applicant's work directly addresses the problem of finding a generalizable strategy for loading drugs bearing ionizable moieties into polymeric nanoparticles.

Cyclodextrins are a class of cyclic oligosaccharides that have been used widely for solubilization of hydrophobic molecules to enable delivery to aqueous environments, including for the purpose of delivering HDAC inhibitors. Cyclodextrins are useful for enabling delivery of lipophilic molecules from aqueous media, but do not, in unmodified form, facilitate controlled release.

Synthetically modified amphiphilic cyclodextrins have been shown to not only form drug loaded nanoparticles but also to outperform traditional polyester particles for certain drugs in terms of drug-loading and controlled release. In addition, advanced cyclodextrin-based cross-linked and linear polymeric architectures have been reported in the literature for their potential application in therapeutics. The modular nature of the CDN platform described here provides the advantage of tailoring the structure, thereby tuning the material properties for drug loading, sustained release and extended in-vivo circulation. HDACi are broadly useful therapeutic molecules for treatment of a range of diseases, and it will be the subject of future work to evaluate CDN capability in specific disease models.

Example 1.6. Conclusions

Applicants has demonstrated the general utility of the β-cyclodextrin-poly (β-amino ester) network as an efficient drug-loading platform for hydrophobic drugs with ionizable moieties. The architectures of these networks are key to their drug loading capacities and biophysical characteristics, as revealed by structure-property relationships.

While both the linker and the surface functionality determine the experimental loadings of the drug, the amine-CDNs (1, 2 & 3) displayed a positive surface charge and the mPEG$_{550}$-CDN (CDN-4) exhibited a near-neutral surface charge. Applicant discovered that a slender, ionizable drug molecular structure (e.g. panobinostat and quisinostat) maximizes drug encapsulation in these networks. While CDN-3 completely releases the drug over 7 days, CDN-4 reduces the release kinetics to affect the complete release within 13-21 days depending on the drug loading. CDN-4 nanoparticles are internalized by cells and deliver bioactive panobinostat in a GL261 model. Pharmacokinetic analyses confirm that CDN-4 nanoparticles can deliver panobinostat to aqueous tissue compartments, with intrathecal administration of panobinostat loaded networks yielding effective delivery to the brainstem/cerebellum and upper spinal cord. These Examples describe the development of a generalizable strategy for nanoparticle encapsulation of ionizable, hydrophobic molecules, which will be a step forward in developing HDACi systems for the treatment of disease.

Example 1.7. Materials

Figure 11B:
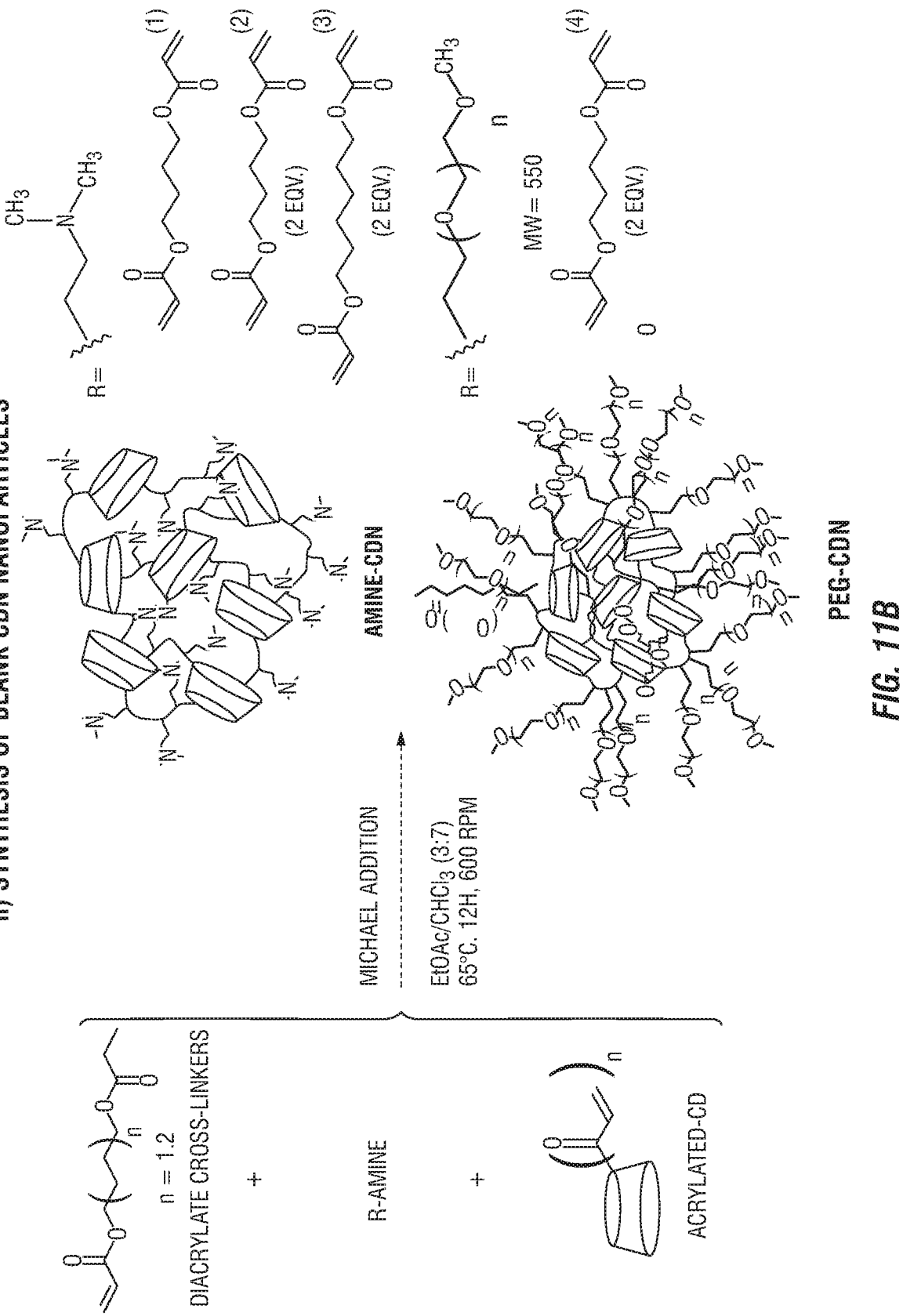
Figure 11C:
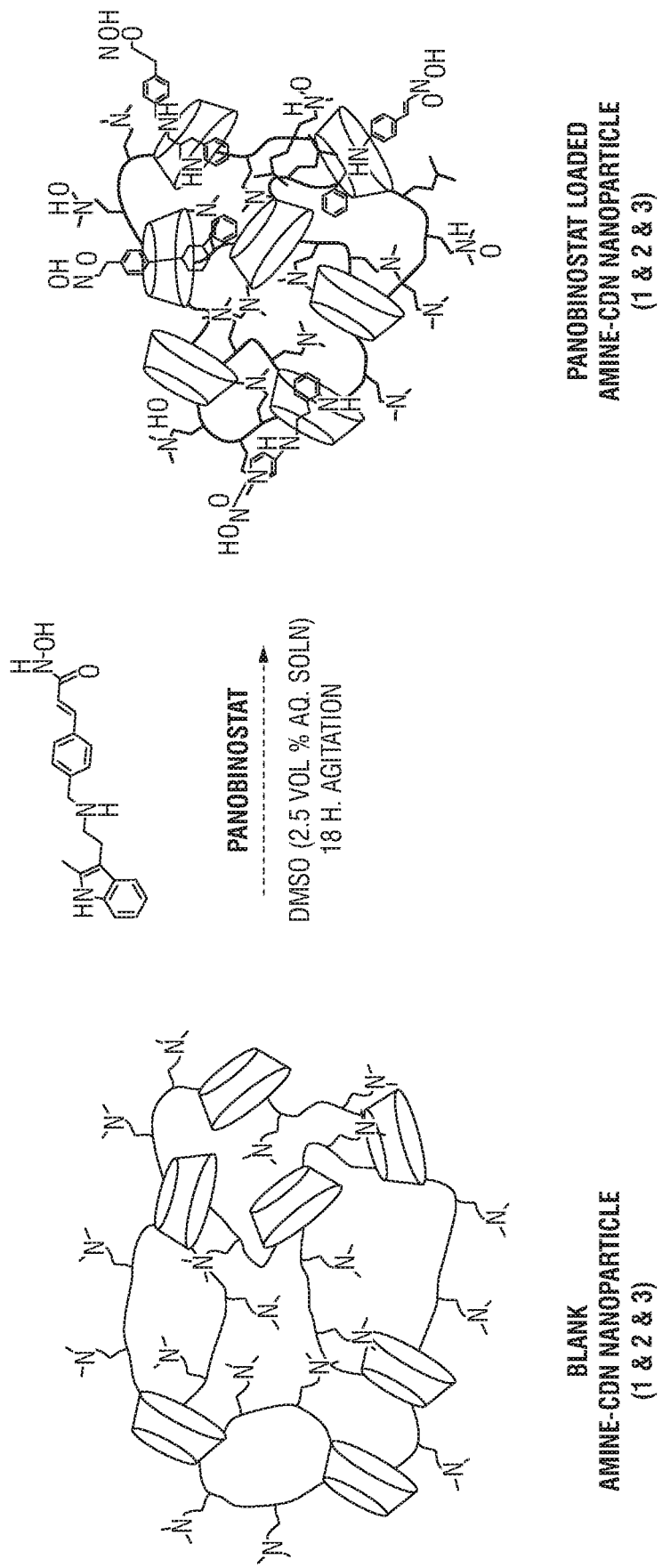

FIGS. 11A-11C illustrate a schematic representation of synthesis of i) acrylated β-cyclodextrin (FIG. 11A); ii) blank (FIG. 11B); and iii) panobinostat-loaded CDN nanoparticles (FIG. 11C).

The following reagents were obtained from Alfa Aesar: β-cyclodextrin, Acrolyl chloride, Chloroform (99%, ACS reagent), Ethyl acetate (99%, ACS reagent), Dimethyl sulfoxide (99%, ACS reagent). 1-methyl-2-pyrrolidone (NMP) and Diethylether (99+%) were purchased from Acros Organics. 1,4-butanediol diacrylate and 1,6-hexanediol diacrylate were obtained from Sigma Aldrich. Methoxy terminated polyethylene glycol (MW 550, mPEG$_{550}$)-Amine was obtained from Creative Peg Works (Chapel Hill, NC). N,N-dimethylethylenediamine was obtained from Oakwood chemicals (Estill, SC, USA). Phosphate Buffer Saline (PBS, pH 7.4), Polyester Transwell inserts (96 well-plate, 0.4 μm pore size) were obtained from Costar (Cambridge, MA). Dialysis cassettes (MWCO 3,500 Dalton) were obtained from Thermo Fisher Scientific (Waltham, MA). GL261 cell lines were obtained. CellTiter-Glo was purchased from Promega (Madison, WI, USA). Costar 96-well plates were purchased from VWR International (Radnor, PA, USA). Dulbecco's modified Eagle medium (DMEM), fetal bovine serum (FBS), trypan blue, and 0.25% trypsin-EDTA were purchased from Gibco Invitrogen (Carlsbad, CA, USA).

Quisinostat (JNJ-26481585) and Panobinostat (LBH589) were purchased from ApexBio (Houston, TX, USA). Camptothecin and Dacinostat (LAQ824) were purchased from Selleckchem (Houston, TX, USA). Nile red was purchased from TCI America. All these chemicals were used as received without further purification unless otherwise noted.

Example 1.8. Synthesis of Acrylated-CD

β-cyclodextrin was oven dried for 12 hours at 110° C. N-methyl-2-pyrrolidone (NMP) was stored with oven-parched molecular sieves (4A) for at least 24 hrs. β-cyclodextrin (2.3 g, 2.0 mmol) was measured and stirred in NMP in a 25 mL round-bottom flask. The solution was cooled with ice-cold water and acryoyl chloride (2.0 mL, 24.7 mmol) was added via a syringe. The resultant solution was stirred under ice-cold condition for further 1 hr, after which the solution was heated up to 21° C. Stirring was continued for further 48 hrs, after which the reaction mixture was poured into approximately 200 mL of distilled water. The precipitated solid was homogenously bath-sonicated, followed by filtration. The collected residue was additionally washed with distilled water twice and then allowed to dry over 48 hrs. The dry white powder recovered was weighed out (3.59 g), and subsequently analyzed by $^1$H-NMR and MALDI-TOF spectrometry.

Example 1.9. Synthesis of Blank CDN Nanoparticles

Amine-CDNs (CDN-1, 2 & 3): β-cyclodextrin-poly(β-amino ester) nanoparticles were synthesized employing Michael addition of a three component mixture. Acrylated β-cyclodextrin (cyclodextrin precursor; 0.06 mmol), 1,4-butanediol or 1,6-hexanediol diacrylate (cross linking polyesters; 1.3 mmol and 2.7 mmol) and N,N-dimethylethylenediamine (1.9 mmol) were dissolved in a solvent mixture of EtOAc/CHCl$_3$ (3:7) and heated at 65° C. under stirring at 600 rpm for 12-14 hours. The reaction mixture was subsequently dried under reduced pressure, and the crude obtained was redissolved in chloroform (approx. 2 mL). The solution thus obtained was dispersed in 15 mL (repeated twice with 5 mL) of diethylether to precipitate out the insoluble network. The supernatant was discarded; and the obtained precipitate was filtered, dried and re-dispersed into fresh DI water (40 mL). The aqueous dispersion of the network was subsequently washed via ultrafiltration through two Amicon Ultra-15 centrifugal filters (10 kDa MWCO, 15 mL capacity) for 20 mins (×2) spins at 5000 RCF. Aliquots were frozen and lyophilized to determine recovery and biophysical characteristics (size and zeta potential).

mPEG$_{550}$-CDN (CDN-4): Acrylated β-cyclodextrin (cyclodextrin precursor; 0.015 mmol), 1,4-butanediol (cross linking polyesters; 0.675 mmol) and mPEG$_{550}$-Amine (0.475 mmol) were dissolved in a solvent mixture of EtOAc/CHCl$_3$ (3:7) and heated at 65° C. under stirring at 600 rpm for 12 hours. The reaction mixture was subsequently dried under reduced pressure, and the crude obtained was re-dispersed into fresh DI water (40 mL). The aqueous dispersion thus obtained was subsequently washed via ultrafiltration through Amicon Ultra-15 centrifugal filters (10 kDa MWCO, 15 mL capacity) for 2, 20 mins spins at 5000 RCF. Aliquots were frozen and lyophilized to determine recovery and biophysical characteristics (size and zeta potential).

Example 1.10. Synthesis of Panobinostat Loaded CDN Nanoparticles

An aqueous dispersion (2.0 mL) of blank CDN nanoparticles (10 mg/mL) was doped with DMSO (50 uL) solution of panobinostat (40 mg/mL; 10% theoretical loading). The aqueous dispersion was left to agitate for 18 h, and subjected to concentration via ultrafiltration through Amicon Ultra-15 centrifugal filters (3 kDa MWCO, 0.5 mL capacity) for 4, 20 mins spins at 5000 RCF. Aliquots were frozen and lyophilized for later studies.

Example 1.11. Synthesis of BODIPY Labeled CDN Nanoparticles

Acrylated β-cyclodextrin (cyclodextrin precursor; 0.015 mmol), 1,4-butanediol (cross linking polyesters; 0.675 mmol), mPEG$_{550}$-Amine (0.354 mmol) and Amino-PEG12-propionic acid (0.121 mmol) were dissolved in a solvent mixture of EtOAc/CHCl$_3$ (3:7) and heated at 65° C. under stirring at 600 rpm for 12 hours. The reaction mixture was subsequently dried under reduced pressure, and the crude obtained was re-dispersed into fresh DI water (40 mL). The aqueous dispersion thus obtained was subsequently washed via ultrafiltration through Amicon Ultra-15 mL centrifugal filters (10 kDa MWCO, 15 mL capacity) for 2, 20 mins spins at 5000 RCF. Aliquots were frozen and lyophilized overnight. For labelling, 5.0 mg of the lyophilized sample was further treated with N-hydroxysuccinimide (6.2 mg), EDC (9.5 μL) and BDP-FL-amine (0.44 μmol) in DMSO (500 μL) at room temperature for 24 hours. The reaction mixture was subsequently washed with DI water via ultrafiltration through Amicon Ultra-2 mL centrifugal filters (3 kDa MWCO, 2 mL capacity) for 3, 20 mins spins at 5000 RCF. Aliquots were frozen and lyophilized overnight.

Example 1.12. MALDI-Tof Spectrometry 20 mg/mL solutions were separately made for analyte (Acrylated-CD) and matrix (2,5-Dihydroxy benzoic acid) in acetonitrile/water (1/9) mixture. A mixture of 4 μL analyte, 14 μL matrix and 2 μL of sodium acetate as cationization agent (1 mg/mL aqueous solution) was homogenized by vortexing. 2 μL of the mixture was transferred onto a MALDI target plate, followed by air drying to prepare a thin matrix/analyte film. Mass spectra was obtained using MS Bruker Autoflex MALDI-Tof mass spectrometer equipped with a nitrogen laser delivering 2 ns laser pulses at 337 nm with positive ion ToF detection performed using an accelerating voltage of 25 kV.

Example 1.13. NMR Spectroscopy

Lyophilized CDN samples were dispersed in dimethyl sulfoxide-d6 (DMSO-d6). $^1$H-NMR spectra were obtained using 300 MHz Bruker Avance NMR spectrometer. The spectra were compared to those of the individual components employed in the synthesis of CDNs.

Example 1.14. Scanning Electron Microscopy

Lyophilized nanoparticles were suspended in an aqueous solution to a final concentration of 20 mg/ml. 5 μl droplets of the above solution were placed onto aluminum stubs with carbon adhesive. Samples were allowed to air dry prior to coating. Samples were sputter coated using a Denton Desk-V Sputter system with gold at 20 mAmps for 20 seconds and imaged using a FEI Quanta 400 environmental scanning electron microscope with an ETD detector at 20 kV and a 4 mm working distance.

Example 1.15. Loading

Drug loading was quantified by absorbance (310 mm for quisinostat, panobinostat and dacinostat; 285 nm for givinostat; 365 nm for camptothecin; 550 nm for Nile Red) on a Tecan plate reader. Lyophilized nanoparticles were dissolved at 5 mg/ml in DMSO. Samples were plated in triplicate (404, nanoparticles and 10 μL DMSO per well) in a clear, flat bottom 96-well assay plate. A control curve was constructed in technical triplicate by adding 40 μL blank nanoparticles per well and spiking with 10 μL of known drug concentration in DMSO. Experimental drug loading was calculated as mass of drug/mass of nanoparticles (w/w %). 40 μL of bortezomib loaded nanoparticles (5 mg/ml aqueous solution) were extracted with 100 μL of ethylacetate. The ethylacetate layer was collected and dried under nitrogen. The contents were dissolved in 40 μL of DMSO and plated in triplicate. A control curve was constructed in technical triplicate by spiking with 10 μL of known drug concentration in DMSO. Absorbance was measured at 285 nm. Experimental drug loading was calculated as mass of drug/mass of nanoparticles (w/w %).

Example 1.16. Dynamic Light Scattering (DLS)

100 μL of CDN (CDN-1, 2 & 3 or 50 μL of CDN-4) aqueous solutions (20 mg/mL) is added to approximately 3 mL of distilled water in a clean dry cuvette. The dispersion is homogenized by repeated agitation and then allowed to stabilize for 2 minutes. Mean hydrodynamic size of the particles were measured using NanoBrook 90Plus Zeta Particle Size Analyzer (Brookhaven Instruments, Holtsville, NY USA). Results were reported as the average of at least three separate readings.

Example 1.17. Zeta-Potential

60 μL of CDN (CDN-1, 2, 3 & 4) aqueous solutions (20 mg/mL) is added to approximately 2 mL of KCl (1 mM aq. solution) in a clean dry cuvette. The dispersion is homogenized by repeated agitation and then allowed to stabilize for 5 minutes Zeta-potential measurements were carried out using NanoBrook 90Plus Zeta Particle Size Analyzer (Brookhaven Instruments, Holtsville, NY USA). Results were reported as the average of at least three separate readings.

Example 1.18. Controlled Release

Lyophilized nanoparticles were dispersed in aqueous solution to a final drug concentration of 1 mg/ml (i.e. 20 mg/mL panobinostat for a sample with 5% experimental loading) and 400 μL was transferred to a 3.5 k MWCO Slide-A-Lyzer Dialysis cassette (Thermo Fisher Scientific, Waltham, MA USA). The cassette was immersed in 4 L PBS (pH 7, replaced at every 24 hrs time point) at 37° C. with gentle stirring (75 rpm). At each time point, 30 μl nanoparticles was removed from the cassette and dissolved in 120 μL DMSO. 50 μl dissolved nanoparticles was added in triplicate to a clear, flat bottom, 96-well plate, and the amount of drug remaining was quantified by absorbance.

Example 1.19. In Vitro Experiments

For IC50 experiments, GL261 cells were seeded at 3,000 cells/1000 into 96 well plates containing Dulbecco's Modified Eagle Medium (DMEM) and 10% Fetal Bovine Serum (FBS). Cells were given 4 hours to adhere prior to drug treatments. Free panobinostat, drug-loaded and blank CDN-4 (21% drug loaded) were dispersed in 2.5% DMSO in cell culture media at 10 mg/mL drug concentration.

Equivalent doses were added to the 96 well plates at 16 serial dilutions with concentrations from 0-70 μM and incubated at 37° C. with 5% $CO_2$ for 72 hours. Cell viability was determined with an $IC_{50}$ value obtained from a CellTiter-Glo Luminescence assay and calculated using GraphPad Prism (San Diego, CA USA). For uptake experiments, GL261 cells were seeded at 90,000 cells/1 mL into 48 well plates containing DMEM and 10% FBS. Panobinostat loaded CDN-4 nanoparticles (250 ug) were incubated with cells for 48 hours, after which cells were thoroughly washed, fixed, and counterstained with DAPI. Images were collected on an upright Nilkon Ti2 microscope.

Example 1.20. In Vivo Experiments

All animal procedures were approved by the Institutional Animal Care and Use Committee at University of Texas Health Science at Houston in accordance with all relevant guidelines. Healthy, female NSG mice were used for in vivo experiments. CDN nanoparticles were administered by direct infusion into the cisternal magna. Briefly, mice were anesthetized with isoflurane (2%) and mounted on a stereotaxic frame (Kopf Instruments, Tujunga, CA, USA). With the head tilted forward, an incision was made across the back of the neck and muscles were gentle retracted to expose the atlanto-occipital membrane. A Hamilton syringe (29 gauge needle, 30° bevel tip) in a 2 uL volume delivered over 1 minute at an injection dept of 1 mm. The needle was left in place for an additional 2 minutes to prevent backflow. All animals received a subcutaneous injection of buprenorphine (1 mg/kg) prior to surgery, and other analgesics to control pain. For MTD studies, panobinostat loaded CDN-4 nanoparticles were administered at increasing concentrations. Mice were observed for at least 2 hours after injection to identify any acute neurological reactions to the infusion, and they were weighed daily thereafter. For pharmacokinetic studies, mice received CDN-4 nanoparticles at a dose of 560 ug panobinostat and euthanized at specified time points (1, 4, 8, 24, and 48 hours after nanoparticle administration, n=5 mice per time point). One mouse in the 24 hour time point died during surgery, leaving n=4 for that experimental group. Blood was collected by cardiac puncture, transferred to a heparinized tube, and centrifuged at 2000 RPM for 10 minutes at 4° C. to obtain plasma. The brainstem and cerebellum were removed from whole brain. The spinal cord was obtained by hydraulic extrusion and divided in two to obtain the upper half. All tissues were flash frozen and stored for later analysis.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A composition comprising:
   particles comprising a cross-linked network of cyclic macromolecules, wherein the cyclic macromolecules are covalently cross-linked to one another by a plurality of cross-linking agents, and at least some of the cross-linking agents are covalently functionalized with a plurality of functional groups; and
   an active agent, wherein the active agent is ionized,
   wherein:
   the plurality of functional groups comprise a chain of at least three atoms that protrude out of the cross-linking agents, and
   the active agent is associated with the particles.

2. The composition of claim 1, wherein the particles comprise a hydrophobic core and a hydrophilic outer surface, wherein the hydrophilic outer surface has a negative or neutral charge.

3. The composition of claim 1, wherein the particles comprise diameters ranging from 100 nm to about 500 nm.

4. The composition of claim 1, wherein the cyclic macromolecules are selected from the group consisting of cyclic oligosaccharides, macrocycles, cyclodextrins, and combinations thereof.

5. The composition of claim 1, wherein the cyclic macromolecules comprise β-cyclodextrin.

6. The composition of claim 1, wherein the cross-linking agents comprise polyacrylic acids.

7. The composition of claim 1, wherein the functional groups are selected from the group consisting of polymers, polyethylene glycol, polylactic acid, alkyl chains, amine-based functional groups, and combinations thereof.

8. The composition of claim 1, wherein the functional groups comprise amine-based functional groups, wherein the amine-based functional groups are exposed to a surface of the particles.

9. The composition of claim 1, wherein the cross-linking agents and the functional groups form a polymer matrix.

10. The composition of claim 9, wherein the polymer matrix comprises poly (β-amino ester).

11. The composition of claim 1, wherein the active agent is a histone deacetylase inhibitor.

12. The composition of claim 1, wherein the active agent is associated with the composition through non-covalent interactions.

13. The composition of claim 11, wherein the histone deacetylase inhibitor includes quisinostat, panobinostat, dacinostat, givinostat, bortezomib, camptothecin, or a combination thereof.

14. The composition of claim 1, wherein the active agent is a hydrophobic molecule.

15. The composition of claim 11, wherein the active agent constitutes at least about 25% by weight of the composition.

16. The composition of claim 11, wherein the active agent is selected from the group consisting of a drug, hormone, analgesic, anti-epileptic, chemotherapeutic, neuroprotective agent, anti-inflammatory agent, anti-neuro-inflammatory agent, cytotoxic agent, histone deacetylase inhibitor, proteasome inhibitor, imaging agent, targeting agent, and combinations thereof.

17. A method of administering an active agent to a subject, the method comprising:
    administering the composition of claim 1 to the subject.

18. The method of claim 17, wherein the particles comprise a hydrophobic core and a hydrophilic outer surface, wherein the hydrophilic outer surface has a negative or neutral charge.

19. The method of claim 17, wherein the cyclic macromolecules are selected from the group consisting of cyclic oligosaccharides, macrocycles, cyclodextrins, and combinations thereof.

20. The method of claim 17, wherein the functional groups are selected from the group consisting of polymers, polyethylene glycol, polylactic acid, alkyl chains, amine-based functional groups, and combinations thereof.

21. The method of claim 17, wherein the functional groups comprise amine-based functional groups, wherein the amine-based functional groups are exposed to a surface of the particles.

22. The method of claim 17, wherein the cross-linking agents and the functional groups form a polymer matrix, wherein the polymer matrix comprises poly ($\beta$-amino ester).

23. The method of claim 17, wherein the active agent is associated with the composition through non-covalent interactions.

24. The method of claim 17, wherein the active agent is selected from the group consisting of a drug, hormone, analgesic, anti-epileptic, chemotherapeutic, neuroprotective agent, anti-inflammatory agent, anti-neuro-inflammatory agent, cytotoxic agent, histone deacetylase inhibitor, proteasome inhibitor, imaging agent, targeting agent, and combinations thereof.

25. The composition of claim 1, wherein the active agent is encapsulated by the particles.

* * * * *